US011996077B2

(12) United States Patent
Mishima et al.

(10) Patent No.: US 11,996,077 B2
(45) Date of Patent: May 28, 2024

(54) NOISE ESTIMATION DEVICE, MOVING OBJECT SOUND DETECTION DEVICE, NOISE ESTIMATION METHOD, MOVING OBJECT SOUND DETECTION METHOD, AND NON-TRANSITORY COMPUTER-READABLE MEDIUM

(71) Applicant: NEC Corporation, Tokyo (JP)

(72) Inventors: Sakiko Mishima, Tokyo (JP); Reishi Kondo, Tokyo (JP)

(73) Assignee: NEC CORPORATION, Tokyo (JP)

( * ) Notice: Subject to any disclaimer, the term of this patent is extended or adjusted under 35 U.S.C. 154(b) by 304 days.

(21) Appl. No.: 17/632,940

(22) PCT Filed: Aug. 8, 2019

(86) PCT No.: PCT/JP2019/031444
§ 371 (c)(1),
(2) Date: Feb. 4, 2022

(87) PCT Pub. No.: WO2021/024471
PCT Pub. Date: Feb. 11, 2021

(65) Prior Publication Data
US 2022/0293081 A1 Sep. 15, 2022

(51) Int. Cl.
*G10K 11/178* (2006.01)

(52) U.S. Cl.
CPC .............................. *G10K 11/17833* (2018.01)

(58) Field of Classification Search
CPC .......... G10K 11/17833; G10L 21/0216; G10L 21/0232; H04R 29/00; H04R 29/004
See application file for complete search history.

(56) References Cited

U.S. PATENT DOCUMENTS 8,712,069 B1 * 4/2014 Murgia .................. H04R 3/005 702/92
9,955,277 B1 * 4/2018 Alexandridis ............ H04S 7/30
(Continued)

FOREIGN PATENT DOCUMENTS

JP 2002-290293 A 10/2002
JP 2002-314637 A 10/2002
(Continued)

OTHER PUBLICATIONS

International Search Report for PCT Application No. PCT/JP2019/031444, dated Nov. 5, 2019.

*Primary Examiner* — Jason R Kurr
(74) *Attorney, Agent, or Firm* — Sughrue Mion, PLLC

(57) ABSTRACT

Provided is a noise estimation device capable of appropriately estimating the amount of noise in an observation signal. The noise estimation device includes: frequency analysis processing means for receiving an input of an observation signal that includes a moving object sound output from an moving object and noise and transforming the observation signal into a feature in each of time-frequency domains; noise range estimation means for estimating a first feature in a first time-frequency domain to which only the noise belongs based on acoustic characteristic information of the moving object sound and the feature; and amount-of-noise estimation means for estimating an amount of noise in a second time-frequency domain to which the moving object sound belongs based on the first feature.

19 Claims, 21 Drawing Sheets

(56) References Cited

U.S. PATENT DOCUMENTS

| | | | | |
|---|---|---|---|---|
| 2015/0117652 | A1* | 4/2015 | Sato | G10L 21/0216 381/56 |
| 2018/0075833 | A1 | 3/2018 | Sugano | |
| 2019/0219679 | A1 | 7/2019 | Komatsu et al. | |
| 2020/0128349 | A1* | 4/2020 | Vilkamo | H04R 1/406 |

FOREIGN PATENT DOCUMENTS

| | | | |
|---|---|---|---|
| JP | 2005-107448 | A | 4/2005 |
| JP | 2016-218160 | A | 12/2016 |
| WO | 2013/021960 | A1 | 2/2013 |
| WO | 2013/179464 | A1 | 12/2013 |
| WO | 2018/047805 | A1 | 3/2018 |

* cited by examiner

NOISE ESTIMATION DEVICE, MOVING OBJECT SOUND DETECTION DEVICE, NOISE ESTIMATION METHOD, MOVING OBJECT SOUND DETECTION METHOD, AND NON-TRANSITORY COMPUTER-READABLE MEDIUM

This application is a National Stage Entry of PCT/JP2019/031444 filed on Aug. 8, 2019, the contents of all of which are incorporated herein by reference, in their entirety.

TECHNICAL FIELD

The present disclosure relates to a noise estimation device, a moving object sound detection device, a noise estimation method, a moving object sound detection method, and a non-transitory computer-readable medium.

BACKGROUND ART

A method of detecting a sound output from a moving object based on a sound input to a microphone is known (for example, Patent Literatures 1 and 2).

Patent Literature 1 discloses a method of estimating the speed of a moving object using a spectrogram template that is obtained by frequency analysis of an observation sound signal using the fact that a frequency of a sound observed by a microphone temporally changes depending on the speed of the moving object.

Patent Literature 2 discloses a method of estimating a maximum Doppler frequency by Fourier transformation of an input signal and a sample frequency of Fourier transformation and the number of samples are adaptively reduced depending on the speed of a moving object. In the method disclosed in Patent Literature 2, a moving object is detected by estimating the maximum Doppler frequency.

Here, in an actual environment, not only a sound output from a moving object but also a noise, are also observed. Therefore, time-frequency characteristics of an observation signal changes, and thus the detection accuracy of the moving object and the estimation accuracy of the Doppler frequency decrease. Therefore, when an observation signal includes not only a target sound but also noise, a noise suppression method for extracting only the target sound is proposed (for example, Patent Literatures 3 and 4).

Patent Literature 3 discloses that, for a signal including a sound signal and noise, the amount of noise suppression is determined based on the amount of noise in an environment where an observation sound is output such that a noise suppression process is performed.

Patent Literature 4 discloses a noise suppression method of calculating an estimated amount of noise with respect to noise data associated with factor information of the occurrence of noise.

CITATION LIST

Patent Literature

Patent Literature 1: International Patent Publication No. WO 2018/047805

Patent Literature 2: Japanese Unexamined Patent Application Publication No. 2002-290293

Patent Literature 3: Japanese Unexamined Patent Application Publication No. 2005-107448

Patent Literature 4: Japanese Unexamined Patent Application Publication No. 2002-314637

SUMMARY OF INVENTION

Technical Problem

The techniques disclosed in Patent Literatures 3 and 4 are not techniques considering acoustic characteristics of a sound source output from a moving object. Therefore, there may be a case where noise from an observation signal can be stably suppressed.

One object of the present disclosure is to solve the above-described problems and to provide a noise estimation device capable of appropriately estimating the amount of noise in an observation signal, a moving object sound detection device, a noise estimation method, a moving object sound detection method, and a non-transitory computer-readable medium.

Solution to Problem

According to the present disclosure, there is provided a noise estimation device including:

frequency analysis processing means for receiving an input of an observation signal that includes a moving object sound output from a moving object and noise and transforming the observation signal into a feature in each of time-frequency domains;

noise range estimation means for estimating a first feature in a first time-frequency domain to which only the noise belongs based on acoustic characteristic information of the moving object sound and the feature; and amount-of-noise estimation means for estimating an amount of noise in a second time-frequency domain to which the moving object sound belongs based on the first feature.

According to the present disclosure, there is provided a moving object sound detection device including:

frequency analysis processing means for receiving an input of an observation signal that includes a moving object sound output from a moving object and noise and transforming the observation signal into a feature in each of time-frequency domains;

noise range estimation means for estimating a first feature in a first time-frequency domain to which only the noise belongs based on acoustic characteristic information of the moving object sound and the feature;

amount-of-noise estimation means for estimating an amount of noise in a second time-frequency domain to which the moving object sound belongs based on the first feature;

noise removal means for outputting a feature obtained by removing the noise from the feature in each of the time-frequency domains to which the observation signal belongs; and detection means for detecting the moving object sound based on the feature from which the noise is removed.

According to the present disclosure, there is provided a noise estimation method including:

receiving an input of an observation signal that includes a moving object sound output from a moving object and noise and transforming the observation signal into a feature in each of time-frequency domains;

estimating a first feature in a first time-frequency domain to which only the noise belongs based on acoustic characteristic information of the moving object sound and the feature; and estimating an amount of noise in a second time-frequency domain to which the moving object sound belongs based on the first feature.

According to the present disclosure, there is provided a moving object sound detection method including:

receiving an input of an observation signal that includes a moving object sound output from a moving object and noise and transforming the observation signal into a feature in each of time-frequency domains;

estimating a first feature in a first time-frequency domain to which only the noise belongs based on acoustic characteristic information of the moving object sound and the feature;

estimating an amount of noise in a second time-frequency domain to which the moving object sound belongs based on the first feature;

outputting a feature obtained by removing the noise from the feature in each of the time-frequency domains to which the observation signal belongs; and detecting the moving object sound based on the feature from which the noise is removed.

According to the present disclosure, there is provided a non-transitory computer-readable medium storing a program that causes a computer to execute:

receiving an input of an observation signal that includes a moving object sound output from a moving object and noise and transforming the observation signal into a feature in each of time-frequency domains;

estimating a first feature in a first time-frequency domain to which only the noise belongs based on acoustic characteristic information of the moving object sound and the feature; and estimating an amount of noise in a second time-frequency domain to which the moving object sound belongs based on the first feature.

According to the present disclosure, there is provided a non-transitory computer-readable medium storing a program that causes a computer to execute:

receiving an input of an observation signal that includes a moving object sound output from a moving object and noise and transforming the observation signal into a feature in each of time-frequency domains;

estimating a first feature in a first time-frequency domain to which only the noise belongs based on acoustic characteristic information of the moving object sound and the feature;

estimating an amount of noise in a second time-frequency domain to which the moving object sound belongs based on the first feature;

outputting a feature obtained by removing the noise from the feature in each of the time-frequency domains to which the observation signal belongs; and detecting the moving object sound based on the feature from which the noise is removed.

Advantageous Effects of Invention

According to the present disclosure, it is possible to provide a noise estimation device capable of appropriately estimating the amount of noise in an observation signal, a moving object sound detection device, a noise estimation method, a moving object sound detection method, and a non-transitory computer-readable medium.

EXAMPLE EMBODIMENTS

Figure 1:
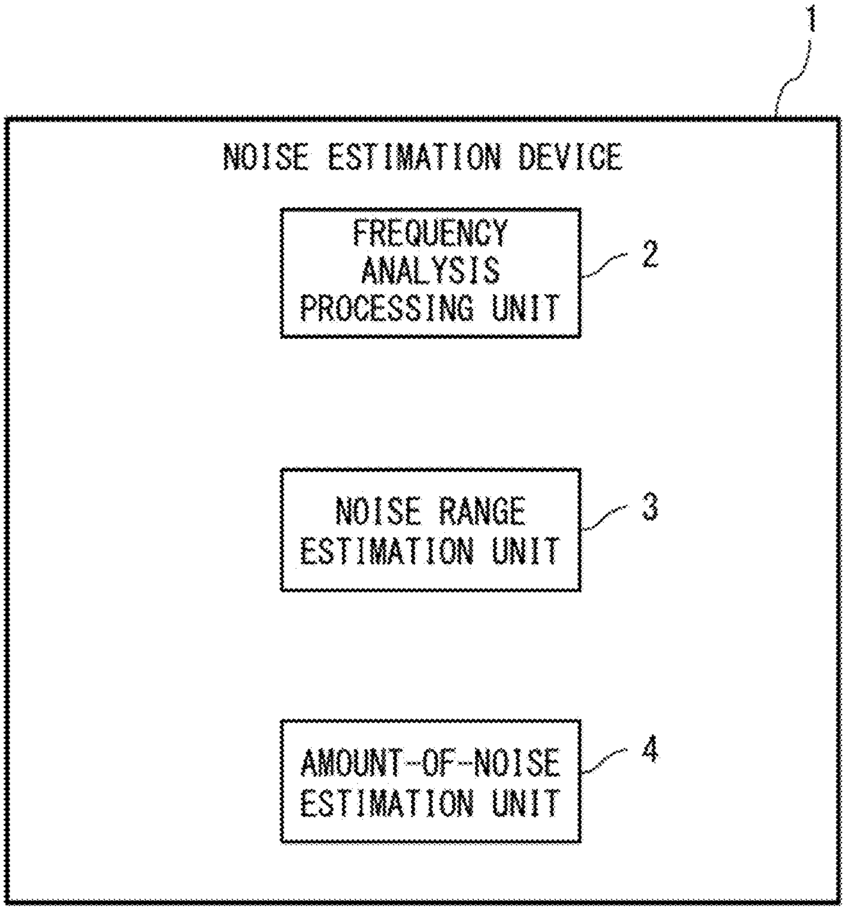
FIG. 1 is a block diagram showing a configuration example of a noise estimation device according to a first example embodiment.

Hereinafter, example embodiments of the present disclosure will be described with reference to the drawings. The following description and drawings will be appropriately omitted and simplified in order to clarify the explanation. In addition, in each of the following drawings, the same components will be represented by the same reference numerals, and the repeated description will be omitted as necessary.

First Example Embodiment

A configuration example of a noise estimation device 1 according to a first example embodiment will be described using FIG. 1. FIG. 1 is a block diagram showing the configuration example of the noise estimation device according to the first example embodiment. The noise estimation device 1 is a device that estimates the amount of noise from an observation signal including a moving object sound output from a moving object and noise.

The noise estimation device 1 includes a frequency analysis processing unit (frequency analysis processing means) 2, a noise range estimation unit (noise range estimation means) 3, and an amount-of-noise estimation unit (amount-of-noise estimation means) 4.

The frequency analysis processing unit 2 receives an input of an observation signal that includes a moving object sound output from a moving object and noise and transforms the observation signal into a feature in each of time-frequency domains. The feature may be a power, may be a logarithmic power, or may be an amplitude.

The noise range estimation unit 3 estimates a first feature in a first time-frequency domain to which only the noise belongs based on acoustic characteristic information of the moving object sound output from the moving object and the feature transformed by the frequency analysis processing unit 2.

The amount-of-noise estimation unit 4 estimates an amount of noise in a second time-frequency domain to which the moving object sound belongs based on the first feature.

The noise estimation device 1 has the above-described configuration and thus estimates the feature in the time-frequency domain to which only the noise belongs using the acoustic characteristic information of the moving object sound output from the moving object. The noise estimation device 1 estimates the amount of noise in the time-frequency domain to which the moving object sound and the noise belong based on the feature in the time-frequency domain to which only the noise belongs. Accordingly, with the noise estimation device 1 according to the first example embodiment, the noise in the observation signal can be appropriately estimated.

Second Example Embodiment

Next, a second example embodiment will be described. The second example embodiment is a specific example embodiment of the first example embodiment.

<Configuration Example of Noise Estimation Device>

Figure 2:
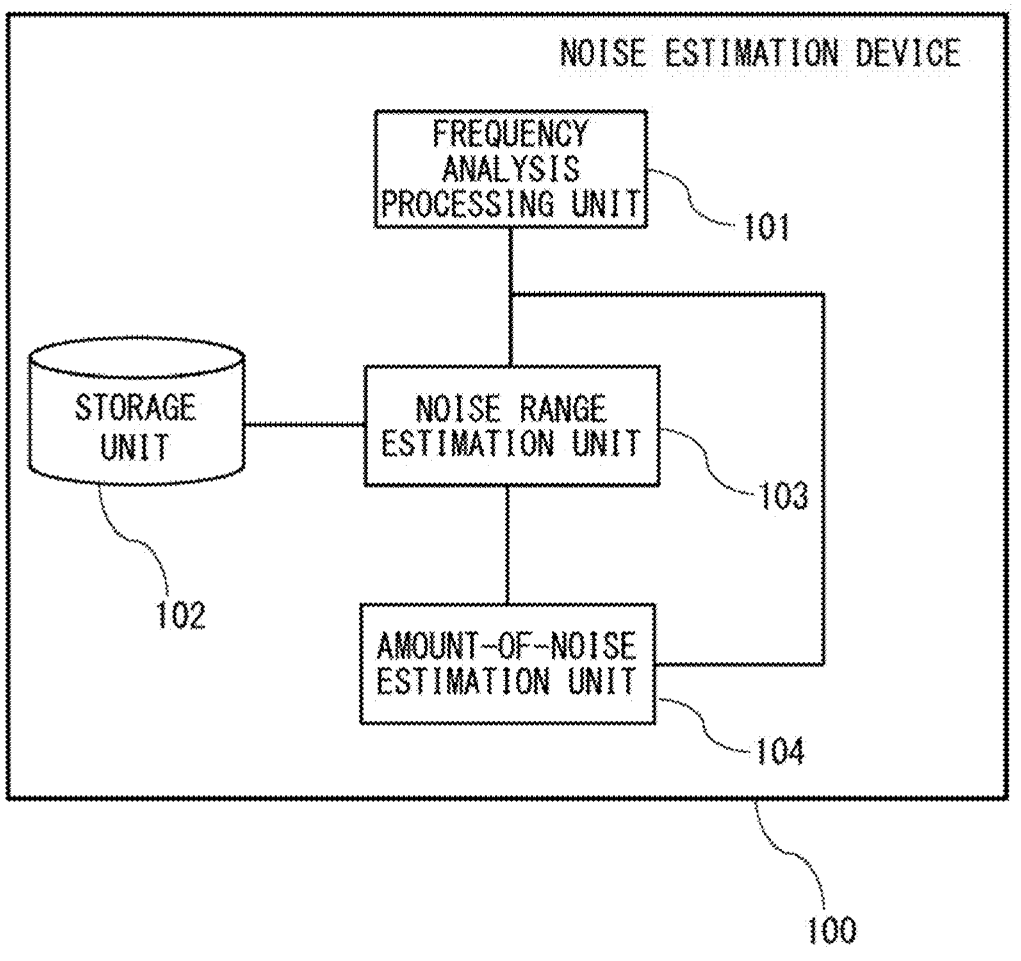
FIG. 2 is a block diagram showing a configuration example of a noise estimation device according to a second example embodiment.

A configuration example of a noise estimation device 100 will be described using FIG. 2. FIG. 2 is a block diagram showing the configuration example of the noise estimation device according to the second example embodiment.

The noise estimation device 100 is a device that estimates the amount of noise from an observation signal including a moving object sound output from a moving object and noise. The noise estimation device 100 may be, for example, a server or a personal computer. The noise estimation device 100 includes a frequency analysis processing unit 101, a storage unit (storage means) 102, a noise range estimation unit 103, and an amount-of-noise estimation unit 104.

The frequency analysis processing unit 101 receives an input of an observation signal that is a time waveform signal corresponding to a moving object sound output from a moving object, and transforms the time waveform signal into a feature in each of time-frequency domains. The frequency analysis processing unit 101 transforms the observation signal into a feature in each of time-frequency domains, for example, FFT (Fast Fourier Transform), CQT (Constant-Q Transformation), or wavelet transform. The feature may be a power, may be a logarithmic power, or may be an amplitude. Hereinafter, an example where the power is the feature will be described.

The frequency analysis processing unit 101 transforms an input observation signal into a power as a feature in each of time-frequency domains (time-frequency bins), and generates a power matrix P where the powers of the time-frequency domains are elements, respectively. Here, when the number of frequency bins to which the observation signal belongs is represented by F and the number of time frames is represented by T, the power matrix P is an F×T matrix.

A storage unit 102 is a storage unit (storage part) that stores information (data) that is required for an operation (process) of the noise estimation device 100 and is, for example, a non-volatile memory such as a flash memory or a hard disk device. The storage unit 102 stores the acoustic characteristic information of the moving object sound output from the moving object. In other words, the storage unit 102 stores acoustic characteristics in a time-frequency-feature domain unique to the moving object. The storage unit 102 may be a storage device provided outside the noise estimation device 100.

When the moving object is an object including a wheel or a motor, a moving object sound output from the moving object has single peak frequency characteristics. In the example embodiment, the description will be made assuming that the moving object sound has single peak frequency characteristics.

In this case, the acoustic characteristic information includes information representing that the moving object sound has single peak frequency characteristics and a peak frequency width representing a frequency width corresponding to a frequency at which the power of the moving object sound is a peak. The peak frequency width is a range from the frequency at which the power of the moving object sound is a peak to a frequency that is lower than the peak frequency by a predetermined value. The predetermine value may be, for example, 3 dB, 10 dB, or an appropriately adjusted value.

The noise range estimation unit 103 estimates a power in a time-frequency domain to which only the noise belongs based on the acoustic characteristic information stored in the storage unit 102 and the power in the time-frequency domain transformed by the frequency analysis processing unit 101.

The noise range estimation unit 103 calculates a distribution of powers (power distribution) in the time-frequency domain to which the observation signal belongs. The noise range estimation unit 103 may form a histogram from the number of times the power appears to calculate the power distribution. Alternatively, the noise range estimation unit 103 may calculate the power distribution using an EM algorithm. In the following description, it is assumed that the noise range estimation unit 103 calculates the power distribution by forming a histogram from the number of times the power appears.

The noise range estimation unit 103 distinguishes the power in the time-frequency domain to which only the noise belongs and the power in the time-frequency domain to which the moving object sound belongs from the power distribution based on the acoustic characteristic information. The noise range estimation unit 103 sets a threshold for distinguishing the power in the time-frequency domain to which only the noise belongs and the power in the time-frequency domain to which the moving object sound belongs from the power distribution. The noise range estimation unit 103 sets the threshold based on the peak frequency width in the acoustic characteristic information and the frequency range (the number of frequency bins) to which the observation signal belongs. The noise range estimation unit 103 sets the threshold based on a proportion of the peak frequency width in the frequency range to which the observation signal belongs.

The noise range estimation unit 103 determines a power in a time-frequency domain to which only the noise belongs in the calculated power distribution using the set threshold, and regards a time-frequency domain corresponding to the determined power as the time-frequency domain to which only the noise belongs.

After the noise range estimation unit 103 estimates the time-frequency domain to which only the noise belongs, the noise range estimation unit 103 generates a mask matrix M for specifying the time-frequency domain to which only the noise belongs. In other words, the noise range estimation unit 103 generates the mask matrix M for specifying the time-frequency domain to which only the noise belongs in the power matrix P. The mask matrix M is also an F×T matrix as in the power matrix P.

The noise range estimation unit 103 generates the mask matrix M in which time-frequency domains to which the observation signal belongs are elements, respectively, each of the time-frequency domains to which only the noise belongs is set to 1 as a predetermined value, and each of the time-frequency domains to which the moving object sound and the noise belong is set to 0 (zero).

Figure 3:
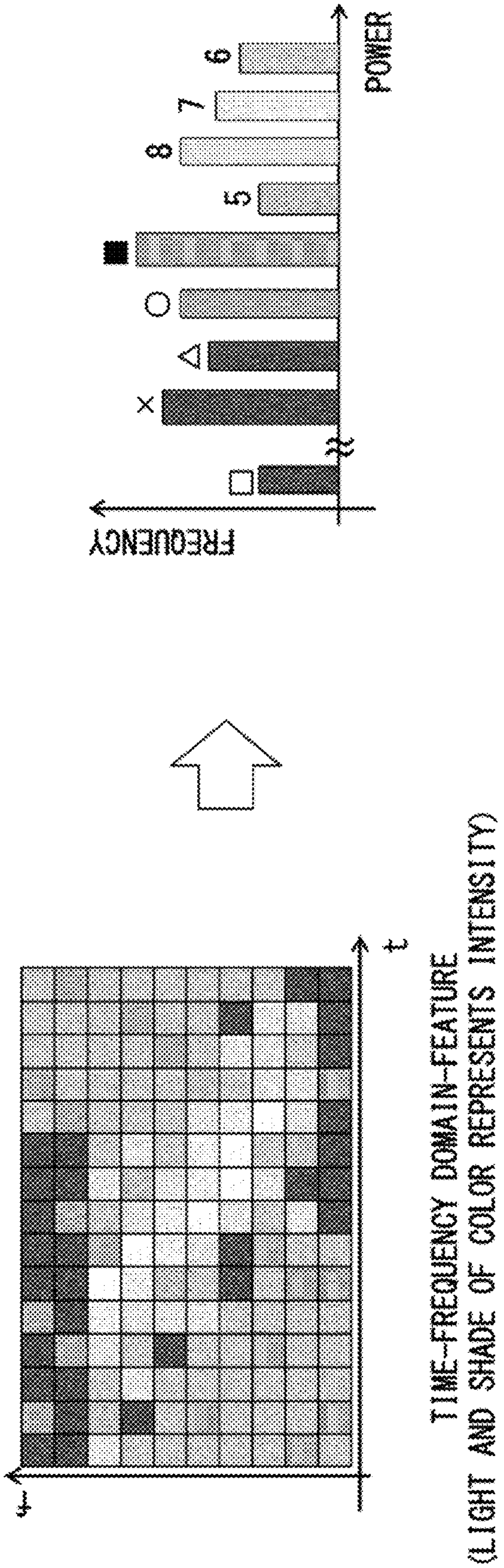
FIG. 3 is a diagram showing a generation process that is executed by a noise range estimation unit.
Figure 4:
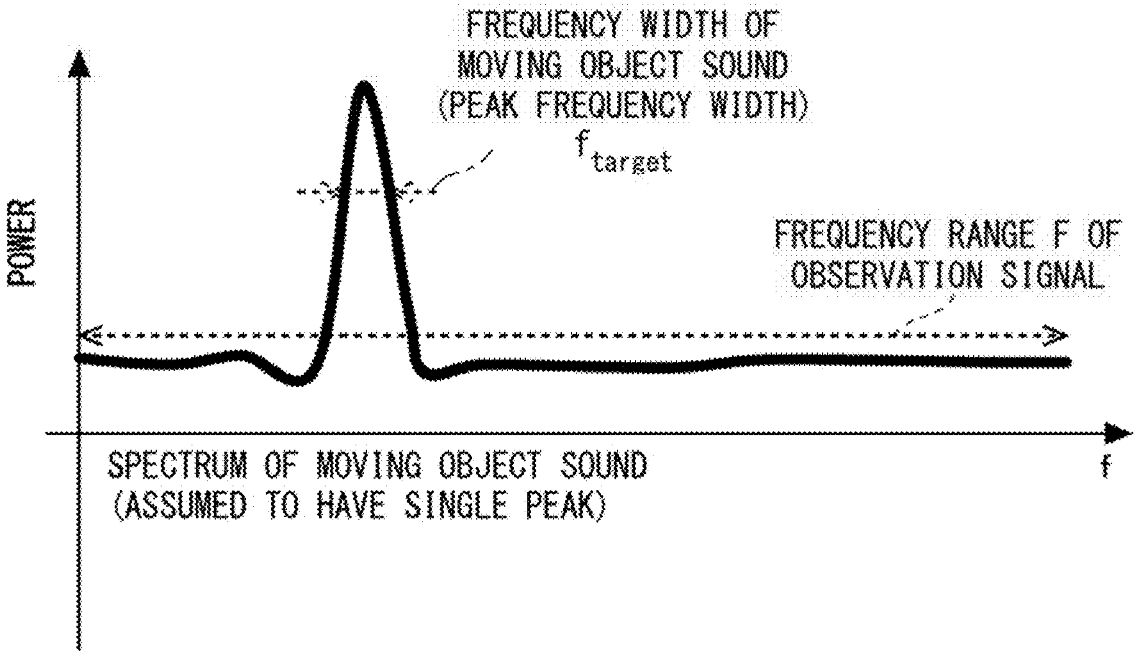
FIG. 4 is a diagram showing the generation process that is executed by the noise range estimation unit.
Figure 5:
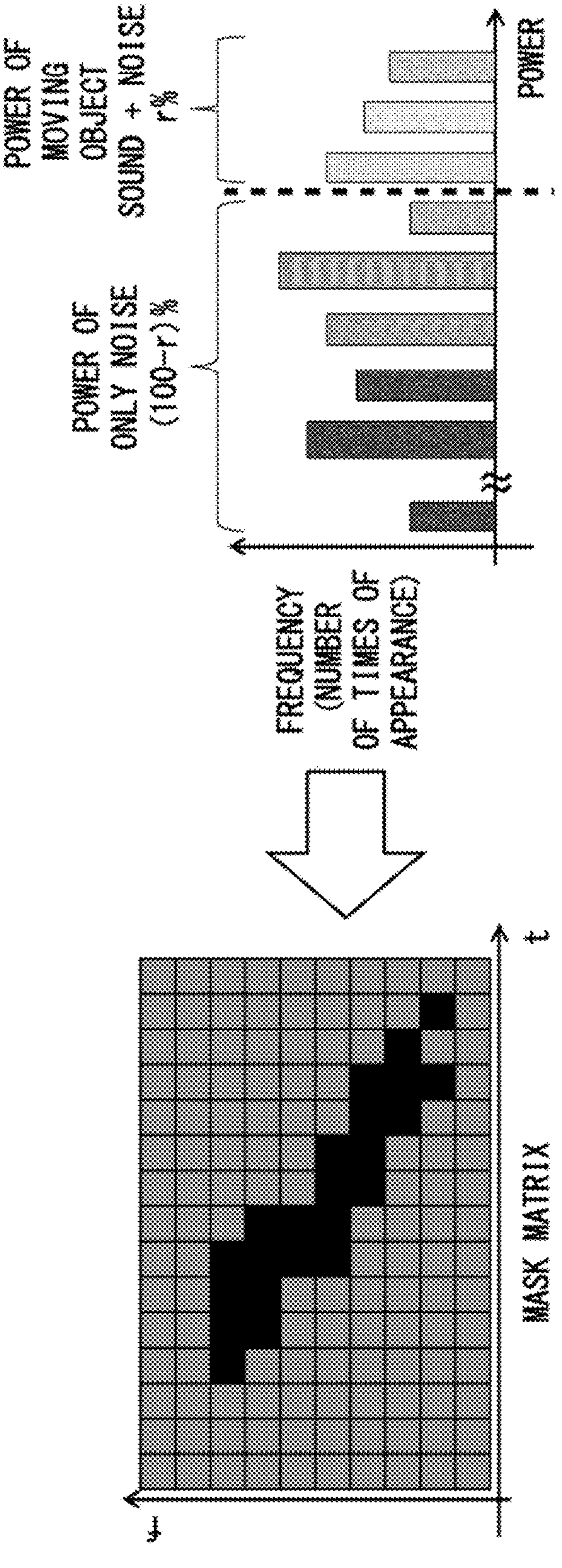
FIG. 5 is a diagram showing the generation process that is executed by the noise range estimation unit.

Here, a generation process in which the noise range estimation unit 103 generates the mask matrix M will be described using FIGS. 3 to 5. FIGS. 3 to 5 are diagrams showing the generation process that is executed by the noise range estimation unit.

First, FIG. 3 will be described. The left side of FIG. 3 shows the power in each of the time-frequency domains after the frequency analysis processing unit 101 transforms the observation signal into the power as the feature in each of the time-frequency domains. On the left side of FIG. 3, the horizontal axis represents the time frame, and the vertical axis represents the frequency bin. On the left side of FIG. 3, the light and shade of the color corresponds to the intensity of the power, a time-frequency domain having a deep color represents that the power is low, and a time-frequency domain having a light color represents that the power is high.

The right side of FIG. 3 shows the histogram that is formed by the noise range estimation unit 103 from the number of times the power appears. The noise range estimation unit 103 counts the number of times each of the powers on the left side of FIG. 3 appears, and calculates the histogram shown on the right side of FIG. 3 as the power distribution. The noise range estimation unit 103 may calculate the power distribution by counting the number of times of appearance per predetermined power range on the left side of FIG. 3 to form the histogram.

Next, FIG. 4 will be described. FIG. 4 is a diagram showing a power spectrum of the moving object sound. The horizontal axis represents the frequency, and the vertical axis represents the power. In FIG. 4, a solid line represents the power spectrum of the moving object sound. As described above, the moving object sound output from the moving object has single peak frequency characteristics. A chain line represents a peak frequency width $f_{target}$, and the peak frequency width $f_{target}$ is stored in the storage unit 102 as the acoustic characteristic information. A dotted line represents a frequency range F to which the observation signal belongs.

Here, it can be seen that the moving object sound belongs to the frequency range of the peak frequency width $f_{target}$ [the number of frequency bins] in the frequency range F [the number of frequency bins] to which the observation signal belongs. In this case, a proportion of the frequency range to which the moving object sound belongs in the frequency range to which the observation signal belongs can be represented by Expression (1).

[Formula 1]

$$r = \left(\frac{f_{target}}{F}\right) \times 100 \quad (1)$$

It can be assumed that the moving object sound output from the moving object belongs to a higher rank r [%] in the power distribution shown on the right side of FIG. 3. The noise range estimation unit 103 sets the threshold to a percentile value of (100−r), and it can be assumed that a range of the power distribution that is lower than or equal to the threshold is composed of powers in the time-frequency domains to which only the noise belongs. The noise range estimation unit 103 applies the threshold to the power distribution in order to estimate the time-frequency domains to which the moving object sound belongs.

When the estimated time-frequency domains are shown in the drawing, as shown on the right side of FIG. 5, a portion of the power distribution belonging to the higher rank r [%] can be considered as the domains to which the moving object sound and the noise belong. In addition, a lower rank (100−r) [%] can be considered as the domains to which only the noise belongs. The noise range estimation unit 103 estimates the powers in the domains to which only the noise belongs from the range of the power distribution that is lower than or equal to the threshold using the assumed threshold that is the percentile value of (100−r), and estimates the powers in the domains to which the moving object sound and the noise belong from the range that is higher than the threshold. The noise range estimation unit 103 regards a time-frequency domain corresponding to the power that is lower than or equal to the threshold as the time-frequency domain to which only the noise belongs.

This way, the noise range estimation unit 103 considers that the time-frequency domains to which the moving object sound belongs are a part of the time-frequency domain to which the observation signal belongs using the fact that the moving object moves to cause a temporal change in the frequency and the power of the moving object sound. The noise range estimation unit 103 estimates the time-frequency domains to which only the noise belongs among the time-frequency domains to which the observation signal belongs.

The noise range estimation unit 103 generates the mask matrix M in which the time-frequency domains to which only the noise belongs are set to 1 and the time-frequency domains to which the moving object sound and the noise belong are set to 0 (zero). The noise range estimation unit 103 may set the time-frequency domains to which only the noise belongs to a predetermined value other than 1.

The mask matrix M can be schematically shown on the left side of FIG. 5. On the left side of FIG. 5, the powers in the time-frequency domains represented by black are power that are higher than the threshold, and these time-frequency domains are set to 0 (zero). In other words, the left side of FIG. 5 shows that the time-frequency domains represented by black are the time-frequency domains to which the moving object sound and the noise belong.

The powers in the other time-frequency domains are lower than or equal to the threshold, and these time-frequency domains are set to 1. In other words, the left side of FIG. 5 shows that the time-frequency domains represented by a color other than black are the time-frequency domains to which only the noise belongs. This way, the noise range estimation unit 103 generates the mask matrix M in which the time-frequency domains to which only the noise belongs are set to a predetermined value. The power matrix P can be said to be a matrix in which each of the elements corresponds to the time-frequency domain to be calculated in the power distribution and the power in each of the time-frequency domains is the value of each of the elements, and the mask matrix M can be said to be a matrix for specifying the time-frequency domains to which the moving object sound belongs in the power matrix P.

Referring back to FIG. 2, the amount-of-noise estimation unit 104 will be described. The amount-of-noise estimation unit 104 estimates the amount of noise in each of the time-frequency domains to which the moving object sound belongs based on the powers in the time-frequency domains to which only the noise belongs. The amount-of-noise estimation unit 104 estimates the amount of noise in each of the time-frequency domains to which the moving object sound belongs using the power matrix P and the mask matrix M.

The amount-of-noise estimation unit 104 selects indices (f,t) of elements other than elements corresponding to the time-frequency domains to which only the noise belongs in the mask matrix M. In other words, the amount-of-noise estimation unit 104 selects indices (f,t) of the elements corresponding to the time-frequency domains to which the moving object sound and the noise belong in the mask matrix M. Here, f represents the frequency bin (1≤f≤F), and t represents the time frame (1≤t≤T).

The amount-of-noise estimation unit 104 extracts a row vector and a column vector including each of the selected elements. The amount-of-noise estimation unit 104 may extract one of the row vector and the column vector including each of the selected elements.

This extraction can be represented by the following numerical expression. For the index (f,t), a vector of the f-th row in the mask matrix M is represented by $M_f$, a column vector of the t-th column in the mask matrix M is represented by $M_t$, a vector of the f-th row in the power matrix P is represented by $P_f$, and a column vector of the t-th column in the power matrix P is represented by $P_t$. In this case, an average value $N_{power}$ (f,t) of noise powers can be represented by the following expression (2).

[Formula 2]

$$N_{power}(f,t) = \frac{1}{N_{num}(f,t)} \times (S_{power}(f) + S_{power}(t)) \quad (2)$$

$$N_{num}(f,t) = \sum_{i=1}^{F} M_f(i) + \sum_{j=1}^{T} M_t(j) \quad (3)$$

$$S_{power}(f) = \sum_{i=1}^{F} (M_f(i) \times P_f(i)) \quad (4)$$

$$S_{power}(t) = \sum_{j=1}^{T} (M_t(j) \times P_t(j)) \quad (5)$$

Here, $N_{num}$ (f,t) represents the number of elements in the column vector and the row vector with respect to the index (f,t). $S_{power}$ (f) represents the cumulative noise power of the column vector with respect to the index (f,t). $S_{power}$ (t) represents the cumulative noise power of the row vector with respect to the index (f,t).

The amount-of-noise estimation unit 104 estimates the average value $N_{power}$ (f,t) of noise powers obtained by Expression (2) as the amount of noise in the P (f,t). In other words, the amount-of-noise estimation unit 104 calculates the average value of powers in the time-frequency domains to which only the noise belongs in the vectors extracted from the mask matrix M and the power matrix P, and regards the calculated average value of powers as the amount of noise in P (f,t).

<Operation Example of Noise Estimation Device>

Figure 6:
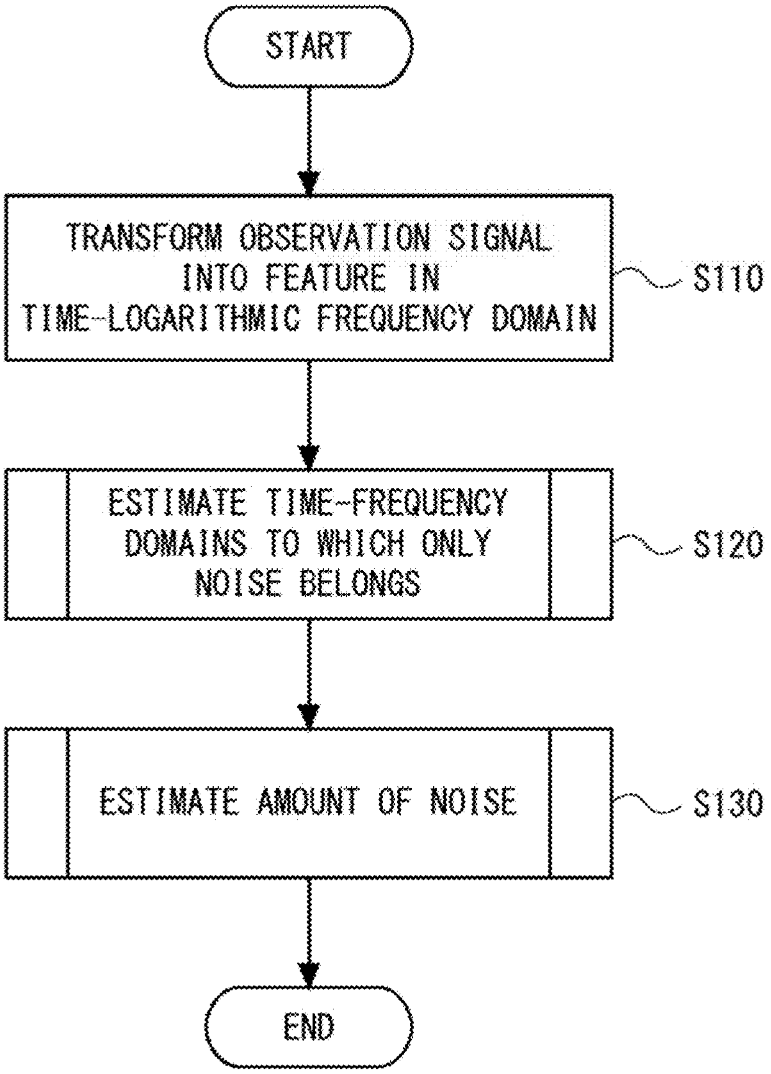
FIG. 6 is a flowchart showing an operation example of the noise estimation device according to the second example embodiment.
Figure 7:
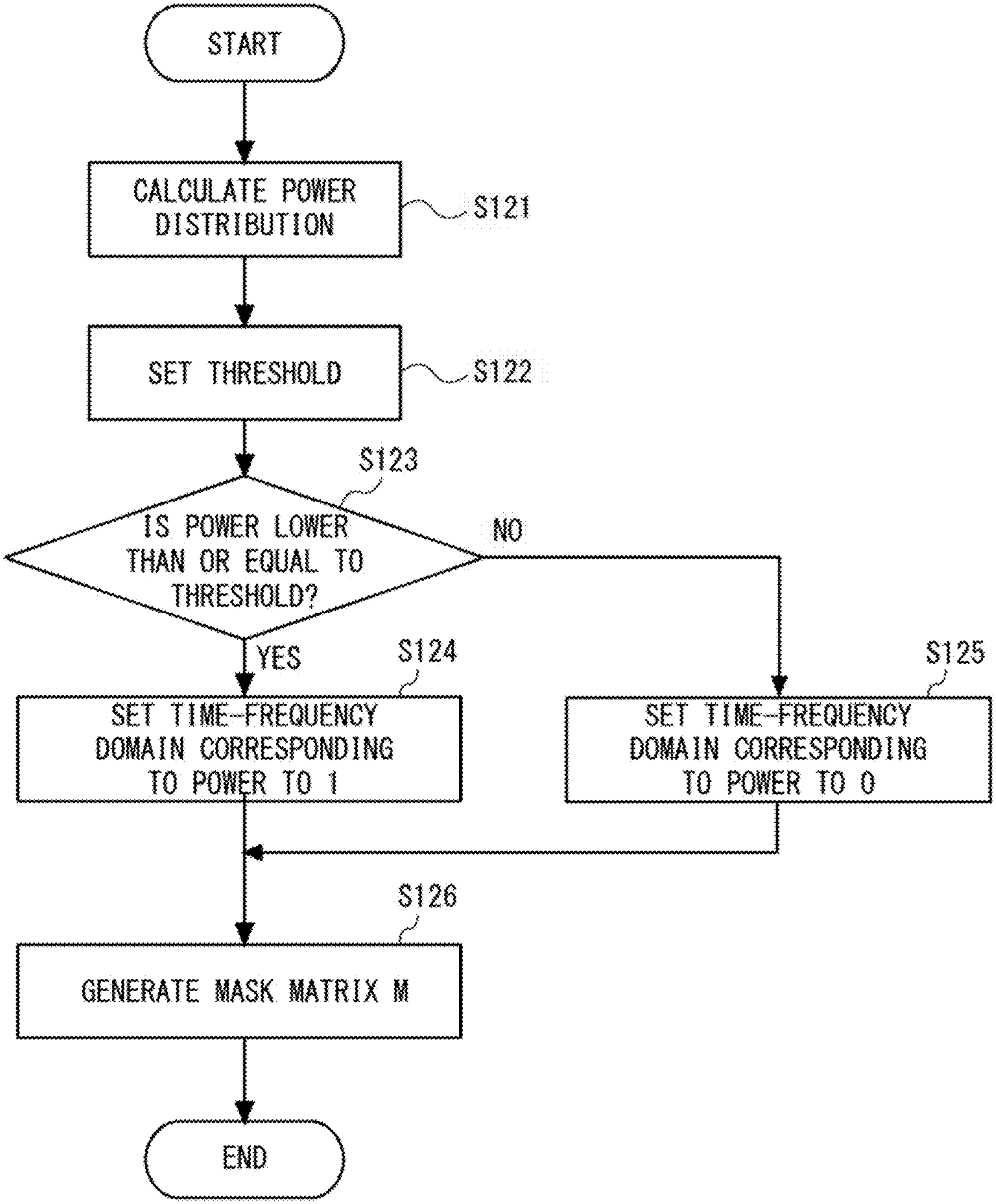
FIG. 7 is a flowchart showing the operation example of the noise estimation device according to the second example embodiment.
Figure 8:
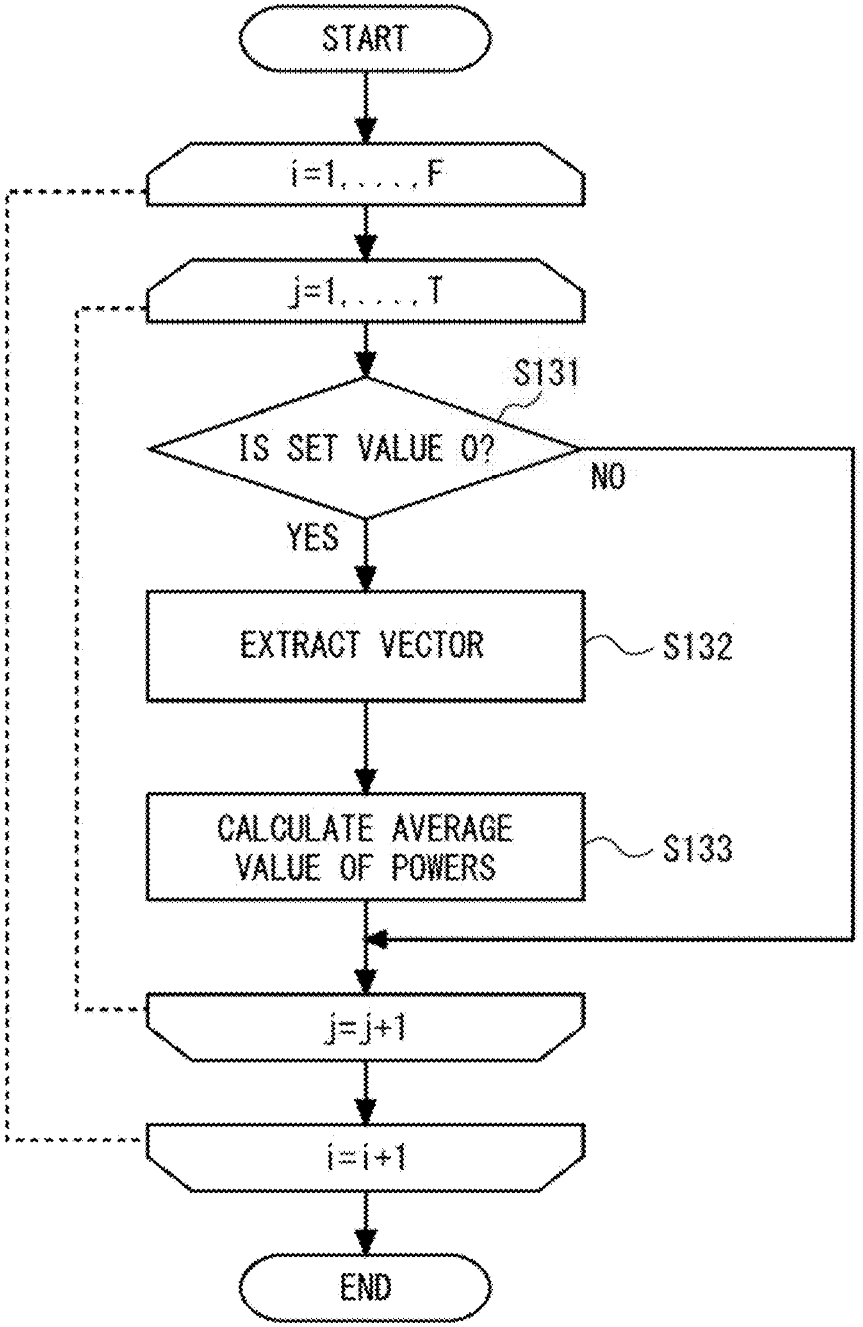
FIG. 8 is a flowchart showing the operation example of the noise estimation device according to the second example embodiment.

Next, an operation example of the noise estimation device 100 will be described using FIGS. 6 to 8. FIGS. 6 to 8 are flowcharts showing the operation example of the noise estimation device according to the second example embodiment.

First, an overall operation of the noise estimation device 100 will be described using FIG. 6.

The frequency analysis processing unit 101 receives an input of an observation signal that is a time waveform signal corresponding to a moving object sound output from a moving object, and transforms the time waveform signal into a feature in each of time-frequency domains (step S110).

The frequency analysis processing unit 101 transforms, for example, the observation signal into the feature in each of the time-frequency domains. For example, FFT, CQT, or wavelet transform can be used for the transformation, and a power spectrum, a CQT spectrum, or a wavelet feature can be obtained as a feature thereof. The feature obtained by the transformation represents the intensity at a frequency at a certain time and will be referred to as "power" in the following description. The frequency analysis processing unit 101 generates the power matrix P where the powers of the time-frequency domains are elements, respectively.

Next, the noise range estimation unit 103 estimates time-frequency domains to which only the noise belongs among the time-frequency domains to which the observation signal belongs using the acoustic characteristic information of the moving object sound output from the moving object (step S120). Assuming that the moving object is an object including a wheel or a motor, a characteristic in which the sound output from the moving object including a wheel or a motor has single peak frequency characteristics is used as an acoustic characteristic.

The amount-of-noise estimation unit 104 estimates the amount of noise based on the power matrix P and the powers in the time-frequency domains to which only the noise belongs (step S130).

Next, FIG. 7 will be described. FIG. 7 is a flowchart showing the details of the process that is executed in step S120 in FIG. 6. Each of the steps shown in FIG. 7 is executed by the noise range estimation unit 103.

The noise range estimation unit 103 calculates the power distribution based on the power in each of the time-frequency domains to which the observation signal belongs (step S121). The noise range estimation unit 103 calculates the power distribution, for example, by forming the histogram from the number of times the power appears.

The noise range estimation unit 103 estimates the threshold for distinguishing the time-frequency domains to which only the noise belongs and the time-frequency domains to which the moving object sound and the noise belong in the calculated power distribution (step S122).

Assuming that the peak frequency width of the moving object in the frequency-feature range is represented by $f_{target}$ (the number of frequency bins), the noise range estimation unit 103 can calculate the proportion r [%] of the frequency range F where the moving object and noise are mixed in the power matrix P from Expression (1). The peak frequency width $f_{target}$ [the number of frequency bins] is stored in the storage unit 102 as the acoustic feature of the moving object sound, and the frequency range F is a frequency range to which the observation signal belongs. The noise range estimation unit 103 reads the peak frequency width $f_{target}$ from the storage unit 102. The noise range estimation unit 103 calculates the proportion r of the frequency width to which the moving object sound belongs in the frequency range to which the observation signal belongs using the peak frequency width $f_{target}$, the frequency range F to which the observation signal belongs, and Expression (1). The noise range estimation unit 103 sets the percentile value of (100−r) as the threshold.

The noise range estimation unit 103 determines whether or not each of the powers in the time-frequency domains to which the observation signal belongs is lower than or equal to the set threshold (step S123).

When the power to be processed is lower than or equal to the set threshold (YES in step S123), the noise range estimation unit 103 sets the time-frequency domain corresponding to the power to 1 (step S124).

On the other hand, when the power to be processed is higher than the set threshold (NO in step S123), the noise range estimation unit 103 sets the time-frequency domain corresponding to the power to 0 (zero) (step S125).

The noise range estimation unit 103 generates the mask matrix M in which the time-frequency domains that are set to 1 or 0 in steps S124 and S125 is elements, respectively (step S126).

Next, FIG. 8 will be described. FIG. 8 is a flowchart showing the details of the process that is executed in step S130 in FIG. 6. Each of the steps shown in FIG. 8 is executed by the amount-of-noise estimation unit 104. In addition, each of the steps shown in FIG. 8 is executed on each of the elements in the power matrix P and the mask matrix M. In other words, the amount-of-noise estimation unit 104 repeatedly executes steps S131 to S133 while incrementing i and j until j is T and i is F.

The amount-of-noise estimation unit 104 determines whether or not the set value of the element of the i-th row and the j-th column in the mask matrix M is 0 (step S131). In other words, the amount-of-noise estimation unit 104 determines whether or not the element of the i-th row and the j-th column in the mask matrix M is a time-frequency domain to which the moving object sound and the noise belong.

When the set value of the element of the i-th row and the j-th column in the mask matrix M is 0 (YES in step S131), the amount-of-noise estimation unit 104 extracts a row vector of the i-th row and a column vector of the j-th column from each of the power matrix P and the mask matrix M (step S132). The amount-of-noise estimation unit 104 selects the row vector and the column vector including the elements corresponding to the time-frequency domains to which the moving object sound and the noise belong from the power matrix P and the mask matrix M.

The amount-of-noise estimation unit 104 calculates the average value $N_{power}$ (i,j) of noise powers using the row vector and the column vector selected from the power matrix P and the mask matrix M and using Expressions (2) to (5), and regards the average value $N_{power}$ (i j) of noise powers as the amount of noise in P (i,j) (step S133). When step S133 is completed, the amount-of-noise estimation unit 104 executes step S131 on the next element.

On the other hand, when the set value of the element of the i-th row and the j-th column in the mask matrix M is not 0 (NO in step S131), the amount-of-noise estimation unit 104 determines this element as an element corresponding to a time-frequency domain to which only the noise belongs, and executes step S131 on the next element.

As described above, the noise estimation device 100 estimates the time-frequency domains to which only the noise belongs using the acoustic characteristic information of the moving object sound, and estimates the amount of noise in the time-frequency domains to which the moving object sound belongs using the powers in the time-frequency domains to which only the noise belongs.

Specifically, the noise estimation device 100 estimates the time-frequency domains to which only the noise belongs while considering that the domains to which the moving object sound belongs are a part of the time-frequency domain using the fact that the moving object moves to cause a temporal change in the frequency and the power.

The noise estimation device 100 selects a plurality of time-frequency domains to which only the noise belongs by observing the time-frequency domains to which the moving object sound and noise belong at the fixed time and the fixed frequency. In other words, the noise estimation device 100 selects the row vector and the column vector from the mask matrix M and the power matrix P, the row vector and the column vector being an element group that relates to elements corresponding to the time-frequency domains to which the moving object sound and the noise belong. The noise estimation device 100 estimates the amount of noise from the average value of powers in the plurality of time-frequency domains to which only the noise belongs using the selected vectors.

This way, regarding the time-frequency domains of which the amount of noise is estimated, the noise estimation device 100 estimates the amount of noise by using, as samples, the powers of the plurality of time-frequency domains to which only the noise belongs. Therefore, the noise estimation device 100 can stably estimate the amount of noise by securing a large number of samples to be used for the noise estimation. Accordingly, with the noise estimation device 100 according to the second example embodiment, the noise in the observation signal can be appropriately estimated.

Third Example Embodiment

Next, a third example embodiment will be described.

<Configuration Example of Noise Estimation Device>

Figure 9:
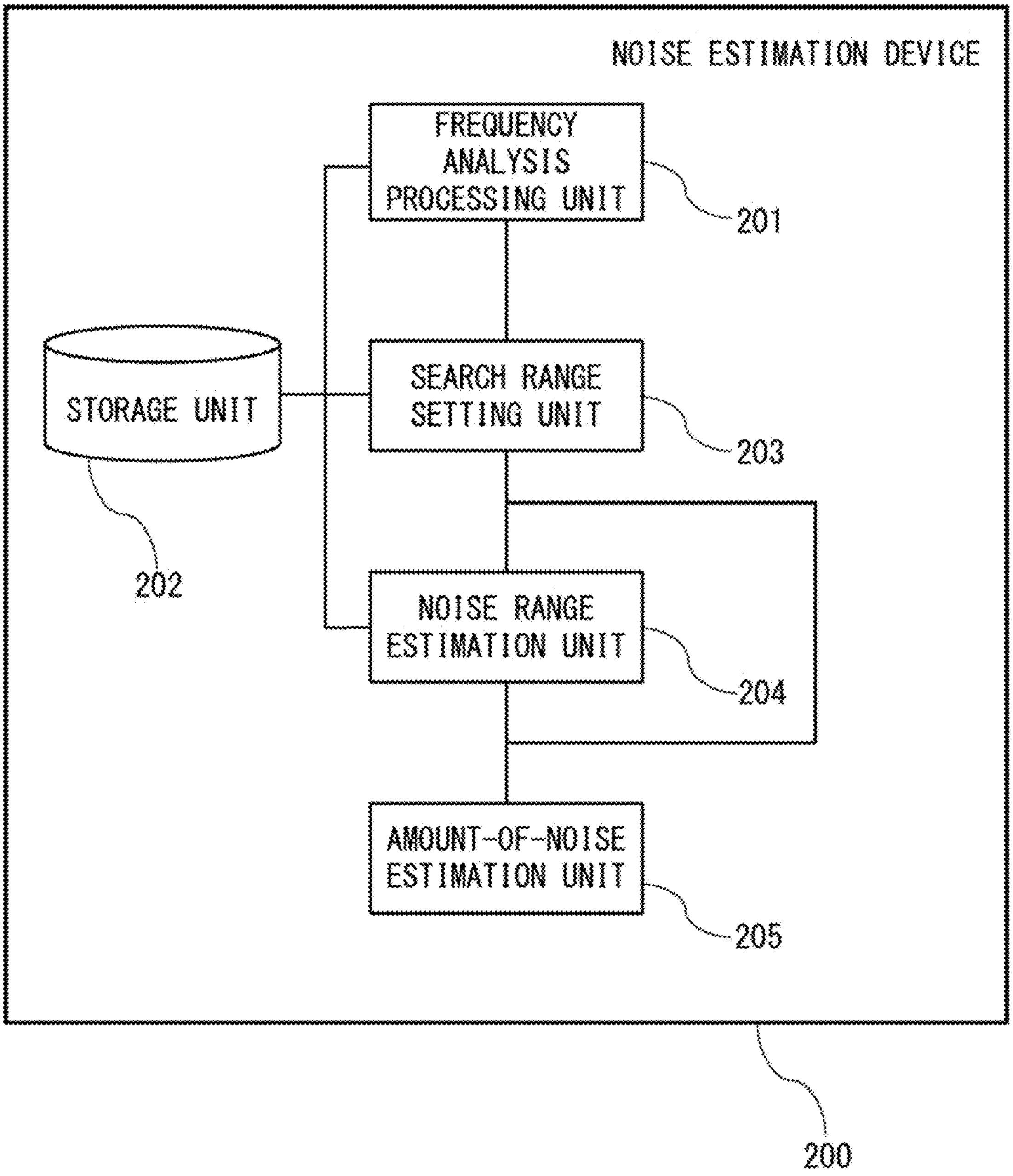
FIG. 9 is a block diagram showing a configuration example of a noise estimation device according to a third example embodiment.

A configuration example of a noise estimation device 200 will be described using FIG. 9. FIG. 9 is a block diagram showing the configuration example of the noise estimation device according to the third example embodiment. The noise estimation device 200 includes a frequency analysis processing unit (frequency analysis processing means) 201, a storage unit (storage means) 202, a search range setting unit (search range setting means) 203, a noise range estimation unit (noise range estimation means) 204, and an amount-of-noise estimation unit (amount-of-noise estimation means) 205.

The frequency analysis processing unit 201 receives an input of an observation signal that is a time waveform signal corresponding to a sound output from a moving object, and transforms the observation signal into a power that is a feature in each of logarithmic frequency domains, and generates a power matrix P. The power matrix P is an F×T matrix as in the second example embodiment in which the number of frequency bins to which the observation signal belongs is represented by F and the number of time frames is represented by T. The frequency analysis processing unit 201 transforms the observation signal into the power in each of the time-logarithmic frequency domains, for example, using CQT or constant Q wavelet transform.

In the second example embodiment, the frequency analysis processing unit 101 transforms the observation signal into the feature in each of the linear frequency domains. In the third example embodiment, the frequency analysis processing unit 201 transforms the observation signal into the feature in each of the logarithmic frequency domains. In the following description, "the time-logarithmic frequency domain" will be simply referred to as "time-frequency domain".

The frequency analysis processing unit 201 generates a search range power matrix P' in which only time-frequency domains where the moving object sound output from the moving object may be present are extracted from the power matrix P based on a search range set by a search range setting unit 203 described below. When the number of frequency bins in the search range set by the search range setting unit 203 is represented by F' (F'≤F) and the number of time frames is represented by T' (T'≤T), the search range power matrix P' is an F'×T' matrix.

The storage unit 202 stores the acoustic characteristic information of the moving object sound and stores the acoustic characteristic information in time-logarithmic frequency-feature domains unique to the moving object. The storage unit 202 stores a power spectrum on a logarithmic frequency axis observed during standstill of the moving object as the acoustic characteristic information, the power spectrum representing the frequency characteristics of the moving object sound during the standstill of the moving object.

The storage unit 202 stores, as the acoustic characteristic information, a peak frequency width $f_{target}$ [the number of frequency bins] representing a predetermined frequency width corresponding to a frequency at which the feature of the moving object sound is a peak. The peak frequency width is the same as the peak frequency width in the second example embodiment. In addition, the storage unit 202 stores speed information of the moving object including a maximum speed and a minimum speed of the moving object.

The search range setting unit 203 estimates a frequency range where the moving object sound is present based on the speed information of the moving object and the power spectrum on the logarithmic frequency axis observed during the standstill of the moving object, and sets the estimated frequency range as the search range, the power spectrum being stored in the storage unit 202. The search range setting unit 203 estimates the frequency range where the moving object sound is present using the Doppler effect caused when an object outputting a sound moves.

When the speed of the moving object relative to an observation point is represented by v [m/s], the frequency where the moving object sound is present is represented by f0 [Hz], and the sound speed is represented by c [m/s], a frequency f1 [Hz] of the moving object sound observed at the observation point is represented by Expression (6).

[Formula 3]

$$f1 = \left(\frac{c}{c-v}\right) \times f0 \tag{6}$$

When the logarithmic frequency is used, Expression (6) is represented by the following Expression (7).

[Formula 4]

$$\log(f1) = \log\left(\left(\frac{c}{c-v}\right) \times f0\right) \tag{7}$$

When Expression (7) is modified as in Expression (8), it can be said that the observation frequency by the Doppler effect can be represented by adding a term composed of the sound speed c and the speed v of the moving object to the frequency f0 of the moving object sound.

[Formula 5]

$$\log(f1)\log c - \log(c-v) + \log(f0) \tag{8}$$

On the right side of Expression (8), the first term and the second term where the frequency f0 of the moving object sound is not present can be assumed in advance from the speed information of the moving object and the observation environment. Therefore, the search range setting unit 203 can limit the search range to the frequency range where the moving object sound output from the moving object may be observed by calculating the first term and the second term based on the maximum speed and the minimum speed and adding the first term and the second term to the spectrum observed during the standstill of the moving object.

At this time, due to Expression (8), the entire power spectrum representing the frequency characteristics during the standstill of the moving object can be shifted to a frequency direction, and the frequency range by the Doppler effect can be obtained only by addition. Therefore, the search range setting unit 203 estimates the frequency range where the moving object sound is present using Expression (8), the power spectrum stored in the storage unit 202, and the maximum speed and the minimum speed of the moving object, and sets the estimated frequency range as the search range. The search range setting unit 203 outputs the search range to the frequency analysis processing unit 201 and a noise range estimation unit 204.

Figure 10:
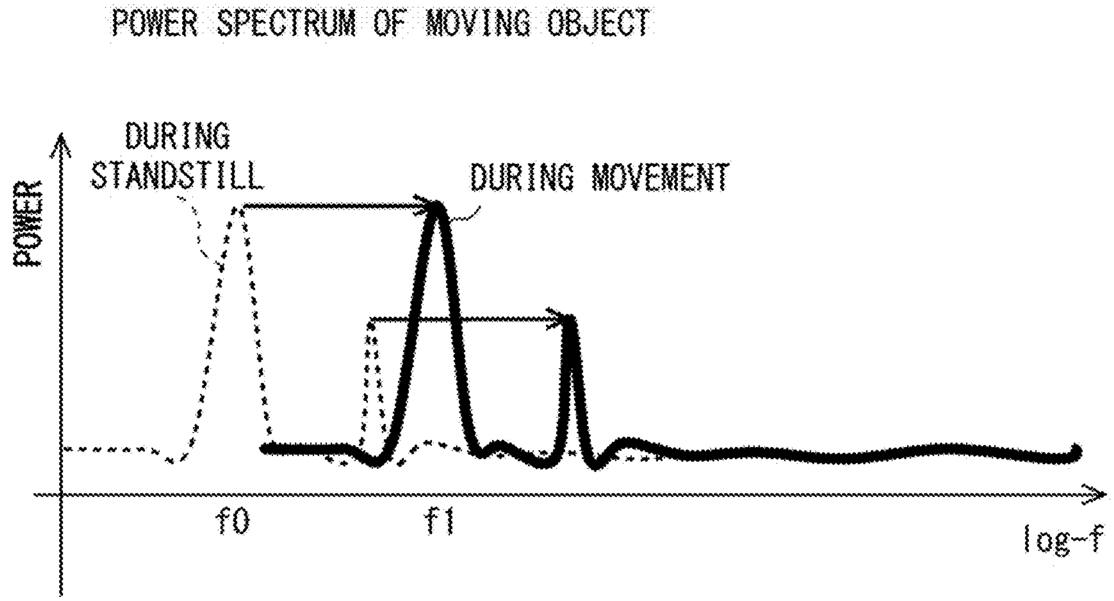
FIG. 10 is a diagram showing a process of estimating a search range.

Here, the process of estimating the search range that is executed by the search range setting unit 203 will be described using FIG. 10. FIG. 10 is a diagram showing the process of estimating the search range. In FIG. 10, the horizontal axis represents the logarithmic frequency, and the vertical axis represents the power value. A dotted line represents the power spectrum during the standstill of the moving object (the frequency characteristics during the standstill of the moving object) that is stored in the storage unit 202. A solid line represents a power spectrum during movement of the moving object at a certain speed.

The search range setting unit 203 can shift the entire power spectrum observed during the standstill of the moving object using the maximum speed and the minimum speed of the moving object and Expression (8), and can estimate a power spectrum observed during the movement of the moving object at the maximum speed and a power spectrum observed during the movement of the moving object at the minimum speed. The frequency range to which the moving object sound belongs is estimated from the power spectrum observed during the movement of the moving object at the maximum speed and the power spectrum observed during the movement of the moving object at the minimum speed.

Referring back to FIG. 9, the noise range estimation unit 204 will be described. The noise range estimation unit 204 calculates a power distribution in the search range by calculating a power distribution of the respective elements in the search range power matrix P'. The noise range estimation unit 204 forms a histogram from the number of times the power appears to calculate the power distribution as in the second example embodiment. The noise range estimation unit 204 may calculate the power distribution using an EM algorithm.

Here, when the frequency width (peak frequency width) of the peak frequency in the power spectrum during the standstill of the moving object is represented by $f'_{target}$ [the number of frequency bins], the proportion r [%] of the observation signal in which the moving object sound and the noise are mixed in the power matrix P' can be calculated by Expression (9).

[Formula 6]

$$r = \left(\frac{f'_{target}}{F'}\right) \times 100 \tag{9}$$

The proportion r calculated by Expression (9) is the proportion of the moving object sound in the search range F', and the noise range estimation unit 204 assumes that the moving object sound belongs to the higher rank r [%] in the power distribution. The noise range estimation unit 204 sets a threshold for determining the time-frequency domains to which only the noise belongs from the power distribution to the percentile value of (100–r). In other words, the noise range estimation unit 204 sets the threshold based on the proportion of the peak frequency width in the search range. As in the second example embodiment, the noise range estimation unit 204 applies the threshold to the power distribution in order to estimate the time-frequency domains to which the moving object sound belongs.

The peak frequency width $f'_{target}$ is stored in the storage unit 202 as the acoustic characteristic information. Therefore, the noise range estimation unit 204 reads the peak frequency width $f'_{target}$ from the storage unit 202 and calculates (sets) the threshold (100–r) using the search range F' output from the search range setting unit 203 and Expression (9). As in the second example embodiment, the noise range estimation unit 204 determines the domains to which only the noise belongs in the power distribution using the threshold that is the percentile value of (100–r).

The amount-of-noise estimation unit 205 estimates the amount of noise in the time-frequency domains to which the moving object sound belongs from the domains to which only the noise belongs that are determined by the noise range estimation unit 204. The amount-of-noise estimation unit 205 estimates the average value obtained from the powers of the domains to which only the noise belongs in the power distribution as the amount of noise in each of the time-frequency domains to which the moving object sound belongs.

Figure 11:
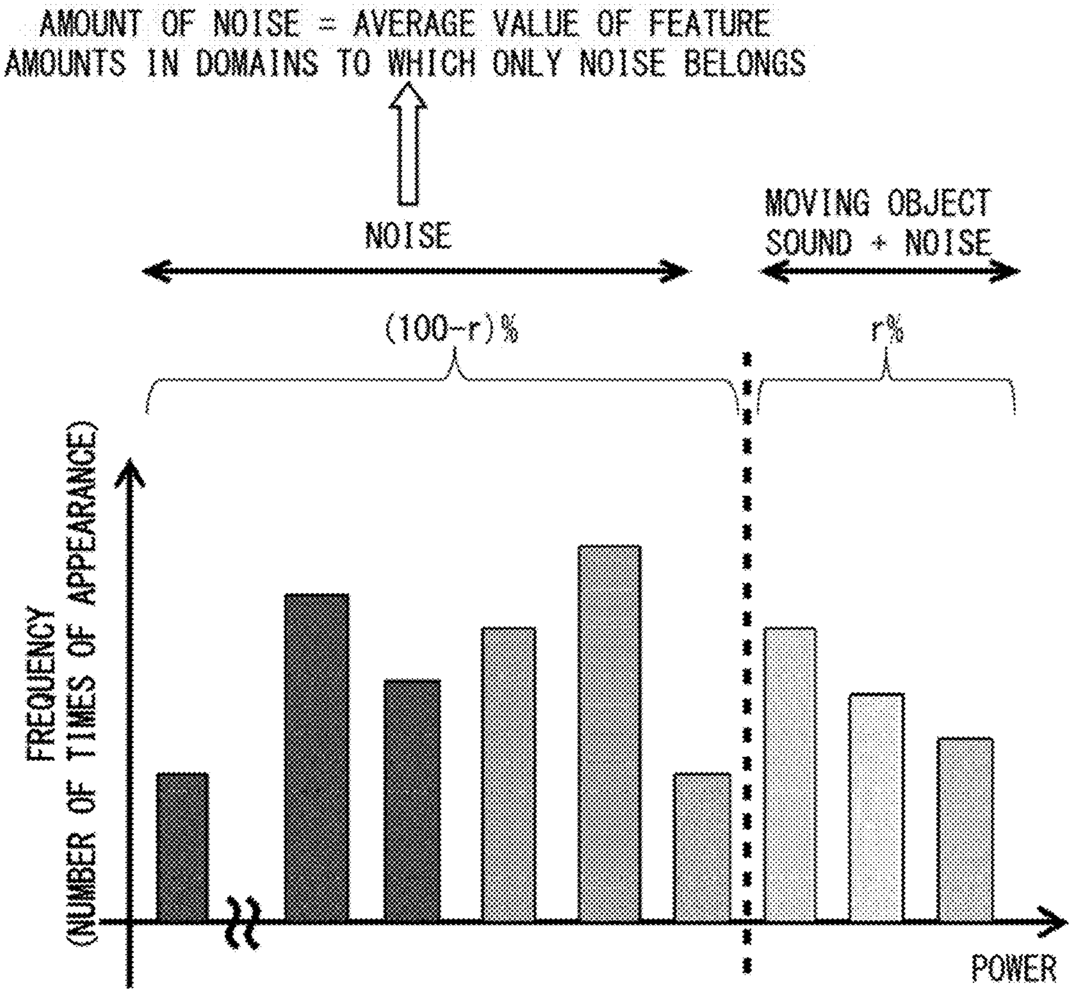
FIG. 11 is a diagram showing a process of estimating the amount of noise.

Here, the process of estimating the amount of noise that is executed by the amount-of-noise estimation unit 205 will be described using FIG. 11. FIG. 11 is a diagram showing the process of estimating the amount of noise. FIG. 11 is a diagram showing the power distribution calculated by the noise range estimation unit 204. The noise range estimation unit 204 can consider that a portion of the power distribution belonging to the higher rank r [%] as domains to which the moving object sound and the noise belong. In addition, a lower rank (100–r) [%] can be considered as domains to which only the noise belongs. The amount-of-noise estimation unit 205 calculates the average value of powers in the domains to which only the noise belongs. The amount-of-noise estimation unit 205 estimates the calculated average value of powers as the amount of noise in each of the time-frequency domains to which the moving object sound and the noise belong.

<Operation Example of Noise Estimation Device>

Figure 12:
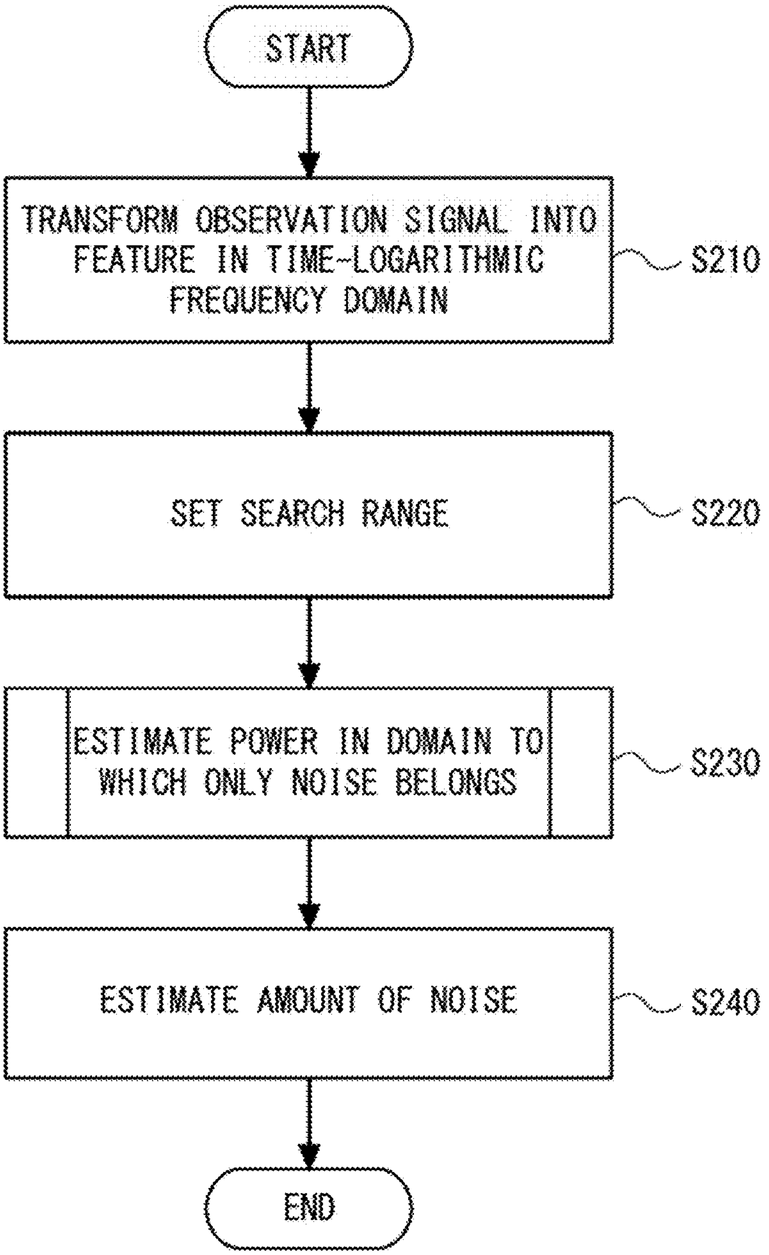
FIG. 12 is a flowchart showing an operation example of the noise estimation device according to the third example embodiment.
Figure 13:
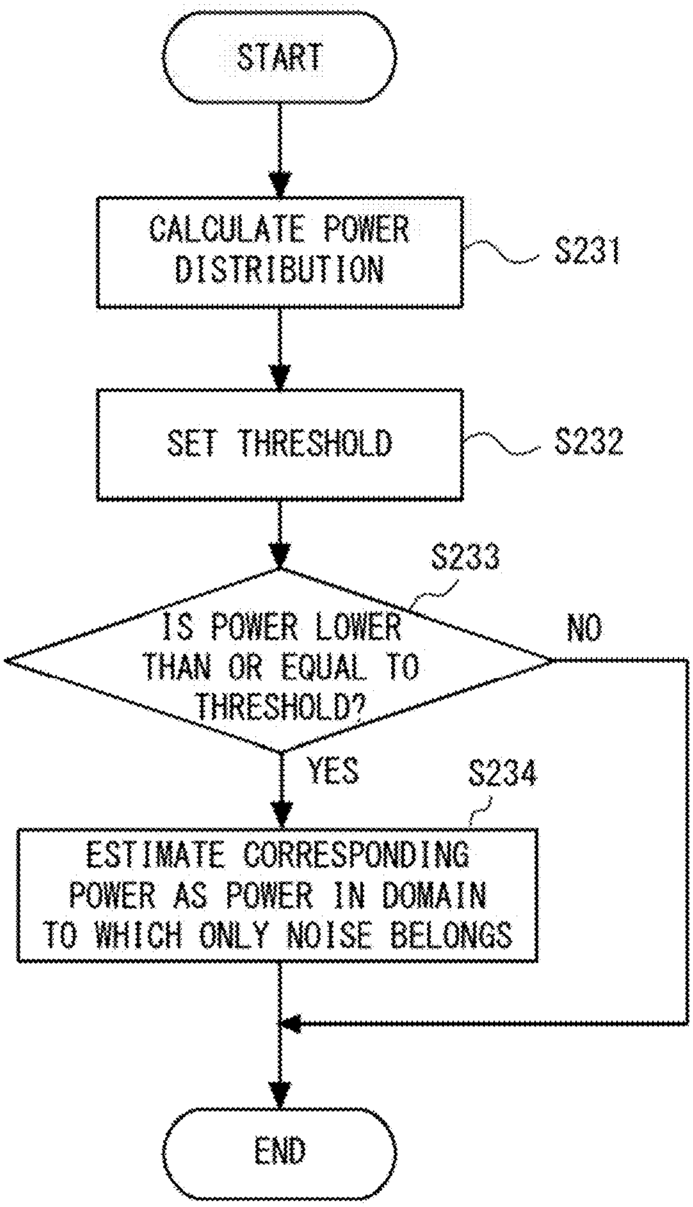
FIG. 13 is a flowchart showing the operation example of the noise estimation device according to the third example embodiment.

Next, the operation example of the noise estimation device 200 will be described using FIGS. 12 and 13. FIGS. 12 and 13 are flowcharts showing the operation example of the noise estimation device according to the third example embodiment. First, an overall operation of the noise estimation device 200 will be described using FIG. 12.

The frequency analysis processing unit 201 receives an input of an observation signal that is a time waveform signal corresponding to a moving object sound output from a moving object, and transforms the time waveform signal into a feature in each of time-logarithmic frequency domains (step S210). The frequency analysis processing unit 201 transforms the observation signal that is a time waveform signal into the power in each of the logarithmic frequency domains and generates the power matrix P. The frequency analysis processing unit 201 transforms the observation signal into the feature in each of the logarithmic frequency domains, for example, using CQT or constant Q wavelet transform.

The search range setting unit 203 estimates the frequency range to which the moving object sound belongs based on the acoustic characteristic information stored in the storage unit 202 and the speed information of the moving object, and sets the search range (step S220).

The search range setting unit 203 regards a frequency range to which the moving object sound belongs using the power spectrum during the standstill of the moving object that is stored in the storage unit 202 as the acoustic characteristic information, the speed information of the moving object, and Expression (8), and sets the search range. The search range setting unit 203 outputs the search range to the frequency analysis processing unit 201 and the noise range estimation unit 204. The frequency analysis processing unit 201 generates the search range power matrix P' in which only time-frequency domains where the moving object sound output from the moving object may be present are extracted from the power matrix P based on the search range.

The noise range estimation unit 204 calculates the power distribution in the search range using the search range power matrix P' and estimates the domains to which only the noise belongs (step S230).

The amount-of-noise estimation unit 205 estimates the amount of noise in terms of a scalar value from the domains to which only the noise belongs in the power distribution (step S240). The amount-of-noise estimation unit 205 calculates the average value of powers in the domains to which only the noise belongs. The amount-of-noise estimation unit 205 regards the calculated average value as the amount of noise in each of the time-frequency domains to which the moving object sound belongs.

Next, FIG. 13 will be described. FIG. 13 is a flowchart showing the details of the process that is executed in step S230 in FIG. 12. Each of the steps shown in FIG. 13 is a process that is executed by the noise range estimation unit 204.

The noise range estimation unit 204 calculates the power distribution using the power of each of the elements in the search range power matrix P' (step S231). The noise range estimation unit 204 forms a histogram from the number of times the power appears to calculate the power distribution.

The noise range estimation unit 204 sets a threshold for determining the powers in the domains to which only the noise belongs in order to apply the threshold to the power distribution estimated in step S231 (step S232). The noise range estimation unit 204 reads the peak frequency width $f'_{target}$ from the storage unit 202 and calculates (sets) the threshold (100−r) using the search range F' output from the search range setting unit 203 and Expression (9).

The noise range estimation unit 204 applies the threshold set in step S232 to the power distribution calculated in step S231 to determine the power in the power distribution is lower than or equal to the threshold (step S233).

When the power in the power distribution is lower than or equal to the threshold (YES in step S233), the noise range estimation unit 204 estimates that the power that is lower than or equal to the threshold is the power in the domain to which only the noise belongs (step S234).

As described above, the noise estimation device 200 estimates the amount of noise in the time-frequency domains to which the moving object sound belongs using the acoustic characteristic information of the moving object sound based on the powers in the time-frequency domains to which only the noise belongs. In other words, the noise estimation device 200 estimates the amount of noise in the time-frequency domains to which the moving object sound belongs based on the powers in the time-frequency domains to which the moving object sound belongs. In other words, the noise in the observation signal can be appropriately estimated. The search range F' set by the search range setting unit 203 is estimated using the power spectrum during the standstill of the moving object. Therefore, it can be said that the search range F' is also the acoustic characteristic information of the moving object sound.

In addition, the noise estimation device 200 estimates the frequency range to which the moving object sound belongs using the acoustic characteristic information of the moving object sound, and sets the estimated frequency range as the search range. In other words, the noise estimation device 200 limits in advance the frequency range to which only the noise belongs using the acoustic characteristic information of the moving object sound. Accordingly, with the noise estimation device 200 according to the third example embodiment, the overall amount of computation can be reduced as compared to a case where the search range is not set.

Further, the noise estimation device 200 uses the features in the logarithmic frequency domains. Therefore, irrespective of the frequency of the moving object sound, the search range can be estimated by applying the same amount of shift to the power spectrum during the standstill of the moving object. Accordingly, with the noise estimation device 200 according to the third example embodiment, the amount of computation can be reduced as compared to a case where the feature in the linear frequency domain is used.

Further, the noise estimation device 200 estimates the powers in the time-frequency domains to which only the noise belongs from the power distribution using the acoustic characteristic information of the moving object sound. The power distribution is a distribution representing the frequency (number of times of appearance) of the power, and is a distribution that does not depend on the frequency and the time. The observation signal undergoes a change in frequency and a temporal change in power when the moving object moves. However, the noise estimation device 200 estimates the amount of noise using only the power information (power distribution) that does not depend on the time and the frequency. Therefore, irrespective of a change in frequency and a temporal change in power, the amount of noise can be appropriately estimated. In other words, the domains to which only the noise belongs can be represented by the power distribution that are composed of the elements extracted from the range having a time width and a frequency width. Therefore, with the noise estimation device 200 according to the third example embodiment, the amount of noise can be stably estimated using the statistic.

In addition, the noise estimation device 200 estimates the amount of noise in terms of a scalar value by calculating the average value of powers in the domains to which only the noise belongs as the amount of noise. Accordingly, with the noise estimation device 200 according to the third example embodiment, the amount of computation for estimating the amount of noise can be reduced.

Fourth Example Embodiment

Next, a fourth example embodiment will be described.

<Configuration Example of Noise Estimation Device>

Figure 14:
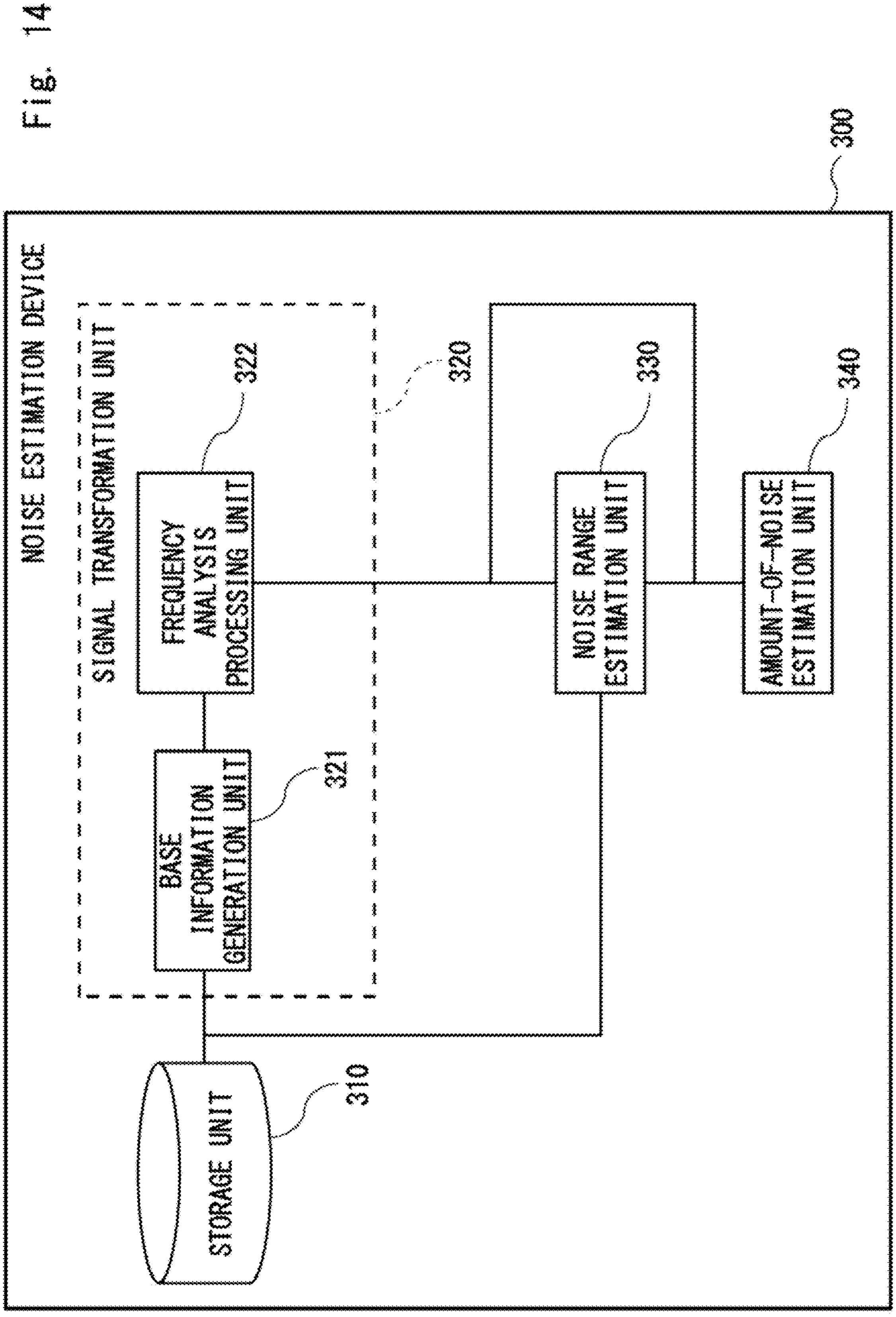
FIG. 14 is a block diagram showing a configuration example of a noise estimation device according to a fourth example embodiment.

A noise estimation device 300 according to a fourth example embodiment will be described using FIG. 14. FIG. 14 is a block diagram showing the configuration example of the noise estimation device according to the fourth example embodiment. The noise estimation device 300 includes a storage unit 310, a signal transformation unit 320, a noise range estimation unit 330, and an amount-of-noise estimation unit 340.

The storage unit 310 stores the acoustic characteristic information of the moving object sound and stores the acoustic characteristic information in time-logarithmic frequency-feature domains unique to the moving object. The storage unit 310 stores a power spectrum on a logarithmic frequency axis observed during standstill of the moving object as the acoustic characteristic information, the power spectrum representing the frequency characteristics of the moving object sound during the standstill of the moving object. The power spectrum stored in the storage unit 310 is the same as the power spectrum in the third example embodiment.

The storage unit 310 stores, as the acoustic characteristic information, a peak frequency width $f''_{target}$ [Hz] representing a predetermined frequency width corresponding to a frequency at which the feature of the moving object sound is a peak. The peak frequency width is the same as the peak frequency width in the third example embodiment, and the unit thereof is [Hz] in the fourth example embodiment. In addition, the storage unit 310 stores speed information of the moving object including a maximum speed and a minimum speed of the moving object.

The signal transformation unit 320 receives an input of an observation signal as a time waveform signal corresponding to a moving object sound that is a time waveform signal corresponding to a moving object sound, and orthogonally transforms the observation signal into a feature in each of time-frequency domains based on the acoustic characteristic information stored in the storage unit 310. The signal transformation unit 320 includes a base information generation unit 321 and a frequency analysis processing unit 322.

The base information generation unit 321 generates bases used for the orthogonal transformation that is executed by the frequency analysis processing unit 322 described below.

When a specific moving object sound is detected, the power spectrum stored in the storage unit 310 may be used as the base information of the orthogonal transformation. In this case, in an existing generation method, the base information generation unit 321 estimates a frequency range F" where the moving object sound is present based on the speed information of the moving object and the power spectrum, and generates a plurality of bases in the frequency range F" where the moving object sound is present. At this time, the base information generation unit 321 can limit a frequency range to which the moving object belongs from the observation signal by freely controlling the number of bases generated.

For example, after assuming the maximum speed and the minimum speed at which the moving object moves, the base information generation unit 321 calculates frequency variations (amounts of frequency shift) in frequency domains where the moving object sound in the observation signal may be present. The base information generation unit 321 generates a plurality of bases corresponding to different frequency variations in the frequency range where the moving object sound is present by adding the frequency variations to the power spectrum during the standstill of the moving object. As a result, the noise estimation device 300 can limit the search range to the frequency range where the moving object sound caused by the moving object may be observed. By preparing a plurality of bases corresponding to different frequency variations in the frequency range calculated from the maximum speed and the maximum speed, activations in the plurality of frequency domains during the orthogonal transformation are obtained as a vector in the frequency direction.

When the moving object sound is detected, the frequency to be observed changes together with the movement of the moving object. Therefore, it is necessary to prepare bases having different frequencies in advance depending on the moving speed. At this time, by using a power spectrum on a logarithmic axis as a base, a base corresponding to a moving speed can be generated by adding the sound speed and the speed as shown in Expression (8).

The frequency analysis processing unit 322 transforms an observation signal that is a time waveform signal corresponding to a moving object sound output from a moving object into a feature in each of time-frequency domains using the plurality of bases set by the base information generation unit 321. Even in the example embodiment, the feature after the transformation is the feature in each of the time-logarithmic frequency domains.

The frequency analysis processing unit 322 orthogonally transforms the observation signal into the feature in each of the time-frequency domains using the plurality of bases. The frequency analysis processing unit 322 may use, for example, NMF (Non-negative Matrix Factorization) that is an approximate orthogonal transformation. When a specific moving object sound is detected, the frequency analysis processing unit 322 may use the power spectrum stored in the storage unit 310 the base information of the orthogonal transformation.

The frequency analysis processing unit 322 calculates activations relative all the bases at each time by orthogonal transformation, and generates a power matrix P" representing the features in the time-frequency domains at each time to which the observation signal belongs. Specifically, the frequency analysis processing unit 322 calculates an activation relative to each of the plurality of bases by orthogonal transformation of the observation signal using each of the plurality of bases generated by the base information generation unit 321 at each time to which the observation signal belongs. The activation obtained by the orthogonal transformation represents the degree of match (component amount) relative to the power spectrum of the moving object sound. The activation calculated using each of the plurality of bases at each time represents the intensity of each of the bases and can be said to be the power in each of the time-frequency-feature domains at each time. Therefore, the power matrix P" can be defined as a power matrix in which the activation relative to each of the plurality of bases at each time is each of elements. The frequency analysis processing unit 322 defines the power matrix P" representing the feature (power) in each of the time-frequency domains to which the observation signal belongs based on the activation calculated at each time.

Figure 15:
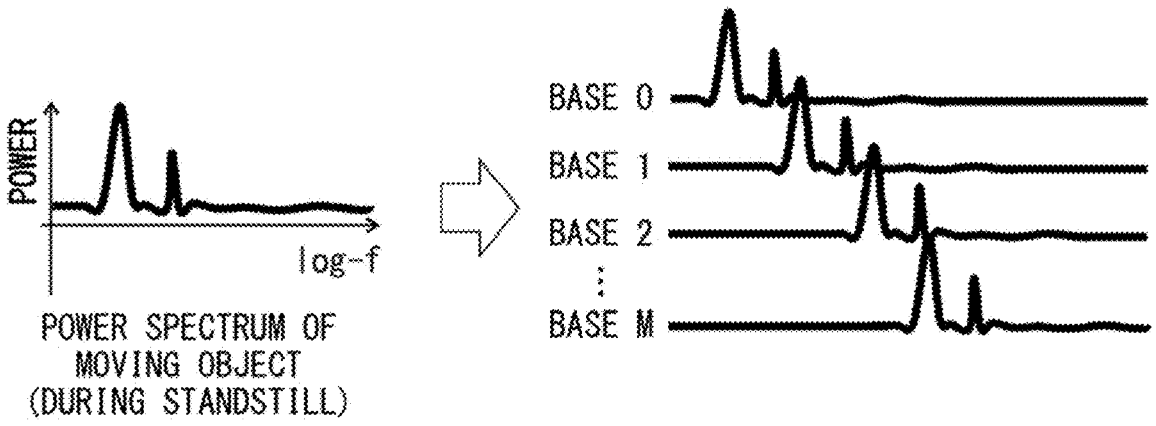
FIG. 15 is a diagram showing the content of a process that is executed by a signal transformation unit.
Figure 16:
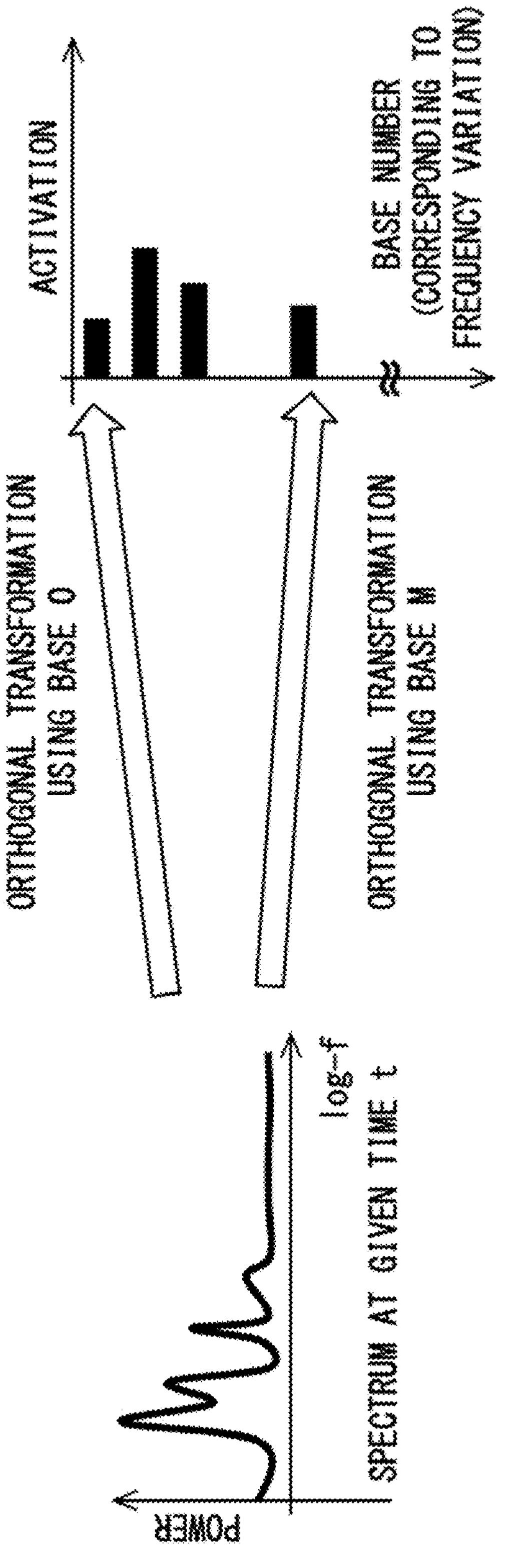
FIG. 16 is a diagram showing the content of the process that is executed by the signal transformation unit.

Here, the content of the process that is executed by the signal transformation unit 320 will be described using FIGS. 15 and 16. FIGS. 15 and 16 are diagrams showing the content of the process that is executed by the signal transformation unit. The left side of FIG. 15 shows a power spectrum during the standstill of the moving object. The power spectrum during the standstill of the moving object is stored in the storage unit 310. The right side of FIG. 15 shows a plurality of bases generated by the base information generation unit 321. The base information generation unit 321 estimates the frequency range where the moving object is present based on the speed information (the maximum speed and the minimum speed) of the moving object and the power spectrum during the standstill of the moving object. The base information generation unit 321 generates a base 0 to a base M by adding different frequency variations to the power spectrum during the standstill of the moving object in the frequency range where the moving object is present (may be present)

FIG. 16 is a diagram showing the process in which the frequency analysis processing unit 322 generates the power matrix P". The left side of FIG. 16 represents the power spectrum at given time t among times to which the observation signal belongs. The frequency analysis processing unit 322 calculates an activation relative to each of the base 0 to the base M by orthogonal transformation of the observation signal using each of the base 0 to the base M generated by the base information generation unit 321 on the left side of FIG. 16.

The right side of FIG. 16 shows an activation relative to each of the bases (each base number), and the frequency analysis processing unit 322 transforms the activation relative to each of the bases into the feature (power) at time t. The frequency analysis processing unit 322 generates the power matrix P" where each base number is an element and the value of activation at time t is the feature relative to each of the elements. Here, the power matrix P" is an F"×T matrix, where F" represents the number of frequency bins and T represents the number of time frames. The number of frequency bins F" corresponds to the number of the plurality of bases generated by the base information generation unit 321, and represents the number of frequency bins in the frequency range of the moving object calculated from the maximum speed and the minimum speed of the moving object.

Referring back to FIG. 14, the noise range estimation unit 330 will be described. The noise range estimation unit 330 estimates the domains to which only the noise belongs from the power distribution of the features obtained by the frequency analysis processing unit 322 based on the acoustic characteristic information stored in the storage unit 310.

The noise range estimation unit 330 calculates a power distribution in the time-frequency domains from the elements of the power matrix P". As in the second and third example embodiments, the noise range estimation unit 330 may calculate the power distribution by counting the number of times of appearance per to form the histogram.

The noise range estimation unit 330 sets a threshold for determining the powers in the time-frequency domains to which only the noise belongs from the power distribution. The proportion r [%] of the observation signal in which the moving object sound and the noise are mixed in the power matrix P" can be calculated by Expression (10).

[Formula 7]

$$r = \left(\frac{f''_{target}}{f''}\right) \times 100 \tag{10}$$

Here, f" [Hz] is the frequency width that can be represented by the number of frequency bins F", and $f''_{target}$ [Hz] is the peak frequency width in the power spectrum during the standstill of the moving object.

The proportion r calculated by Expression (10) is the proportion of the moving object sound in the frequency range f", and the noise range estimation unit 330 assumes that the moving object sound belongs to the higher rank r [%] in the power distribution. The noise range estimation unit 330 sets a threshold for determining the powers in the time-frequency domains to which only the noise belongs from the power distribution to the percentile value of (100–r). In other words, as in the third example embodiment, the noise range estimation unit 330 sets the threshold based on the frequency proportion of the frequency width (peak frequency width) of the moving object sound in the frequency range where the moving object sound is present.

The amount-of-noise estimation unit 340 estimates the amount of noise in the time-frequency domains to which the moving object sound belongs based on the powers in the time-frequency domains to which only the noise belongs that are determined by the noise range estimation unit 330. The amount-of-noise estimation unit 340 regards the average value of powers in the domains to which only the noise belongs in the power distribution as the amount of noise in each of the time-frequency domains to which the moving object sound belongs. The amount-of-noise estimation unit 340 estimates the amount of noise as in the third example embodiment, and thus the detailed description thereof will not be repeated.

<Operation Example of Noise Estimation Device>

Figure 17:
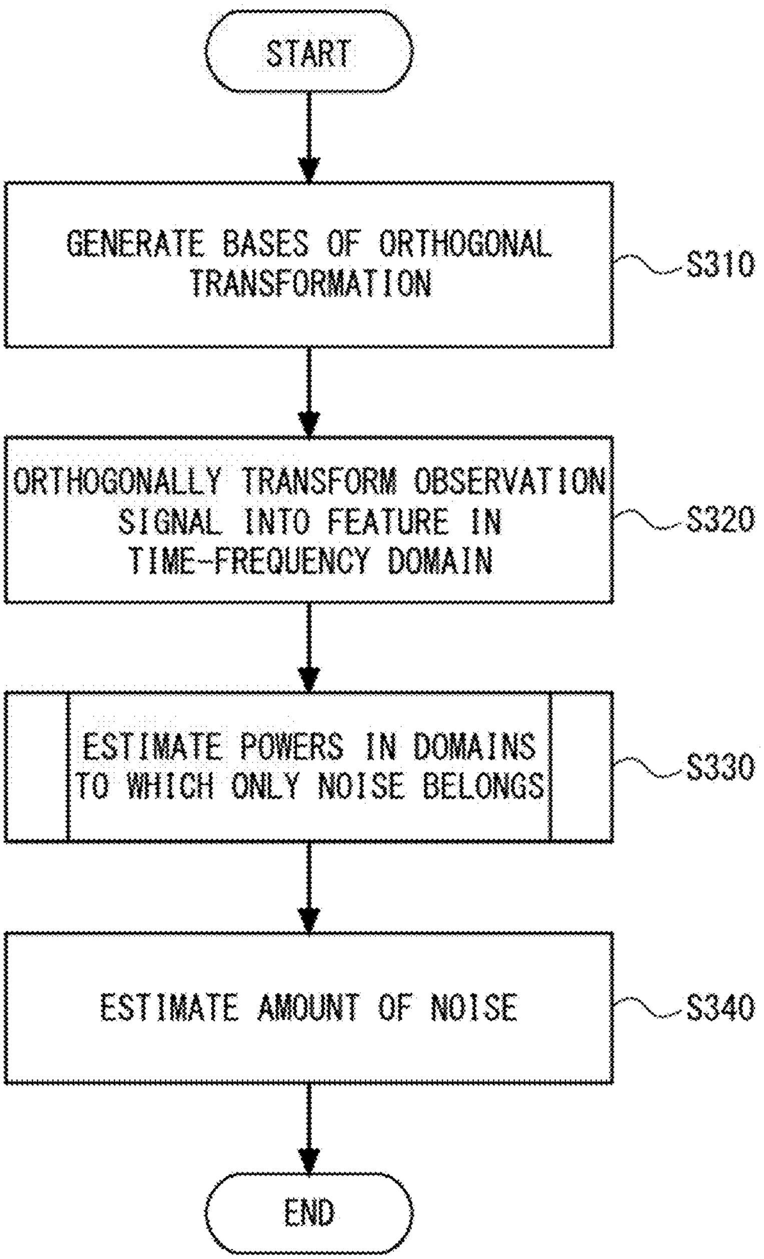
FIG. 17 is a flowchart showing an operation example of the noise estimation device according to the fourth example embodiment.
Figure 18:
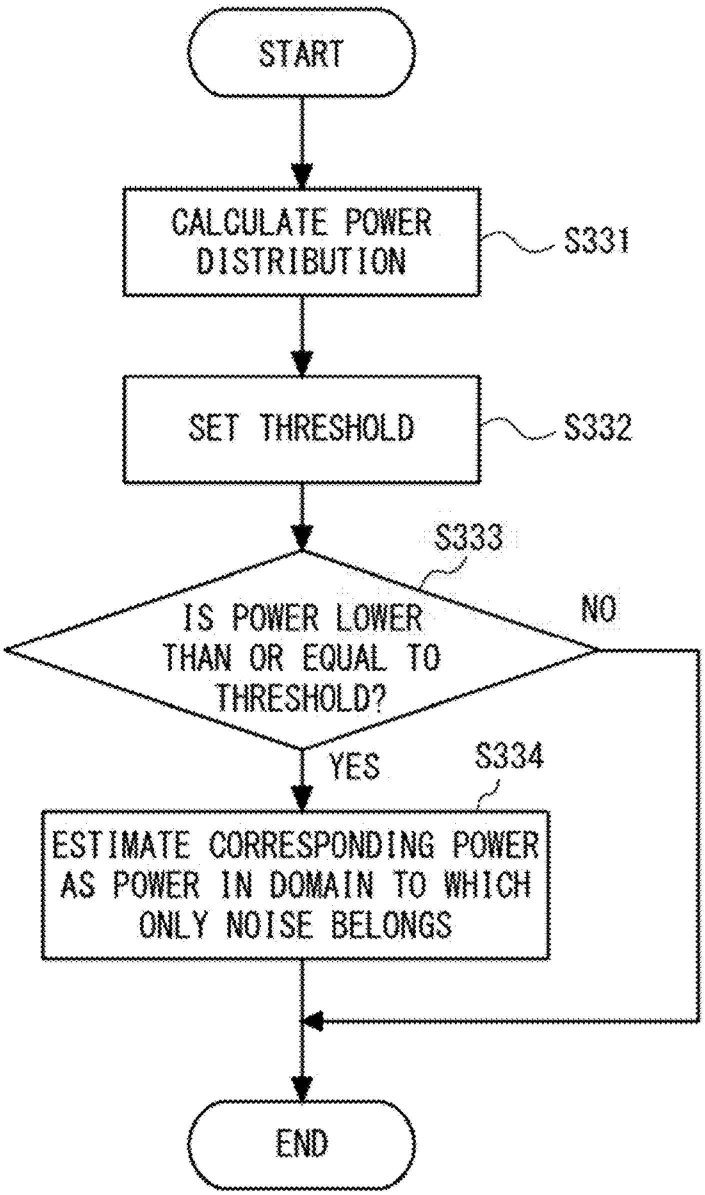
FIG. 18 is a flowchart showing the operation example of the noise estimation device according to the fourth example embodiment.

Next, an operation example of the noise estimation device 300 will be described using FIGS. 17 and 18. FIGS. 17 and 18 are flowcharts showing the operation example of the noise estimation device according to the fourth example embodiment.

First, an overall operation of the noise estimation device 300 will be described using FIG. 17. The base information generation unit 321 generates a plurality of bases using orthogonal transformation (step S310).

The base information generation unit 321 calculates frequency variations in the frequency range where the moving object sound may be present based on the maximum speed and the minimum speed of the moving object stored in the storage unit 310. The base information generation unit 321 generates a plurality of bases corresponding to different frequency variations in the frequency range where the moving object sound may be present by adding the calculated frequency variations to the power spectrum during the standstill of the moving object. As a result, the search range can be limited to the frequency range where the observation signal caused by the moving object may be observed.

By preparing a plurality of bases corresponding to different frequencies (frequency variations) in the frequency range calculated from the maximum speed and the maximum speed, the base information generation unit 321 generates activations in the plurality of frequency domains during the orthogonal transformation as a vector in the frequency direction. At this time, the base information generation unit 321 can limit a frequency range to which the moving object belongs from the observation signal by freely controlling the number of bases generated.

Next, the frequency analysis processing unit 322 orthogonally transforms an observation signal that is a time waveform signal corresponding to a moving object sound output from a moving object into a feature in each of time-frequency domains (step S320).

The frequency analysis processing unit 322 calculates an activation relative to each of the plurality of bases by orthogonal transformation of the observation signal using all of the bases generated by the base information generation unit 321 at each time to which the observation signal belongs. The frequency analysis processing unit 322 generates the power matrix P" representing the feature in each of the time-frequency domains based on the activation calculated at each time. As described above, the activation can be said to be the intensity of a base signal, and the generated power matrix P" can be defined as the powers representing the features in the time-frequency domains.

Here, the power matrix P" obtained in step S320 is an F"×T matrix, where F" represents the number of frequency bins and T represents the number of time frames. Here, F" represents the number of bases generated in step S310, and represents the number of frequency bins in the frequency range of the moving object calculated from the maximum speed and the minimum speed of the moving object.

The noise range estimation unit 330 calculates the power distribution in the frequency range to which the moving object sound belongs using the power matrix P" and estimates the domains to which only the noise belongs (step S330).

The amount-of-noise estimation unit 340 estimates the amount of noise in terms of a scalar value from the domains to which only the noise belongs in the power distribution (step S340). The amount-of-noise estimation unit 340 calculates the average value of powers in the domains to which only the noise belongs in the power distribution, the domains being domains of the powers in the time-frequency domain to which only the noise belongs. The amount-of-noise estimation unit 340 estimates the calculated average value as the amount of noise in each of the time-frequency domains to which the moving object sound belongs. In step S340, the process that is executed by the amount-of-noise estimation unit 340 is the same as the process that is executed by the amount-of-noise estimation unit 205 in the third example embodiment.

Next, FIG. 18 will be described. FIG. 18 is a flowchart showing the details of the process that is executed in step S330 in FIG. 17. FIG. 18 shows basically the same content of the process as that of the flowchart shown in FIG. 13, and each of the steps shown in FIG. 18 is a process that is executed by the noise range estimation unit 330.

The noise range estimation unit 330 calculates the power distribution using the power of each of the elements in the search range power matrix P" (step S331). The noise range estimation unit 330 forms a histogram from the number of times the power appears to calculate the power distribution.

The noise range estimation unit 330 sets a threshold for determining the powers in the domains to which only the noise belongs in order to apply the threshold to the power distribution estimated in step S331 (step S332). The noise range estimation unit 330 sets a threshold different from that of the third example embodiment and determines the powers in the domains to which the only the noise belongs in the power distribution. The noise range estimation unit 330 reads the peak frequency width $f''_{target}$ from the storage unit 310, and calculates (sets) the threshold (100−r) using the frequency width f'' [Hz] that can be represented by F'' [the number of frequency bins] estimated by the base information generation unit 321 and Expression (10).

The noise range estimation unit 330 applies the threshold set in step S332 to the power distribution calculated in step S331 to determine the power in the power distribution is lower than or equal to the threshold (step S333).

When the power in the power distribution is lower than or equal to the threshold (YES in step S333), the noise range estimation unit 330 estimates that the power that is lower than or equal to the threshold is the power in the time-frequency domain to which only the noise belongs (step S334).

As described above, the noise estimation device 300 generates a plurality of bases corresponding to different frequency variations in the frequency range to which the moving object sound belongs based on the acoustic characteristic information of the moving object sound, and orthogonally transforms the observation signal into the feature in each of the time-frequency domains using the plurality of bases. This way, the noise estimation device 300 can estimate the amount of noise in a feature space suitable for detecting the moving object sound. Therefore, the noise in the observation signal can be appropriately estimated.

In addition, by limiting the frequency range for generating the bases, the same effects as that of the case where the domains to which only the noise belongs are limited in advance using the acoustic characteristics of the moving object can be obtained. Accordingly, with the noise estimation device 300 according to the fourth example embodiment, as in the third example embodiment, the amount of computation can be reduced as compared to the case where the frequency range to which the moving object sound belongs is limited. The frequency range F'' estimated by the base information generation unit 321 is estimated using the power spectrum during the standstill of the moving object. Therefore, the frequency range F'' and f'' that can be represented by the frequency range F'' can also be said to be the acoustic characteristic information of the moving object sound.

Fifth Example Embodiment

Next, a fifth example embodiment will be described. The fifth example embodiment relates to a moving object sound detection device that receives an input of an observation signal, removes noise from the observation signal, and detects a moving object sound. Specifically, the fifth example embodiment relates to a moving object sound detection device in which the noise estimation device described in any one of the second to fourth example embodiments functions as a noise estimation unit (noise estimation means) and a moving object sound is detected based on the amount of noise estimated by the noise estimation unit. In the fifth example embodiment, the moving object sound detection device in which the noise estimation device 100 according to the second example embodiment functions as the noise estimation means will be described. However, the noise estimation device according to the third example embodiment or the fourth example embodiment may configure the noise estimation means.

<Configuration Example of Moving Object Sound Detection Device>

Figure 19:
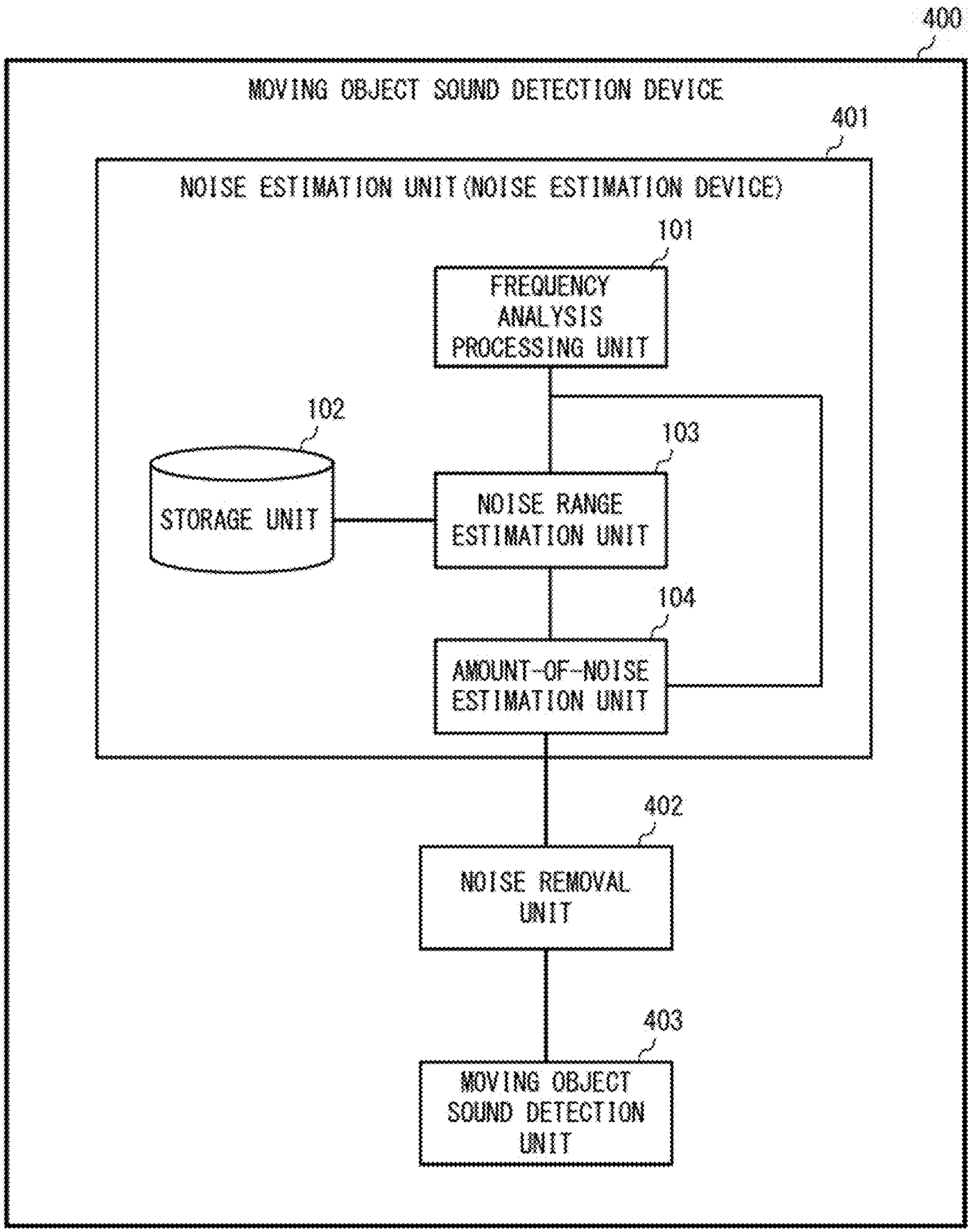
FIG. 19 is a block diagram showing a configuration example of a moving object sound detection device according to a fifth example embodiment.

A moving object sound detection device 400 according to the fifth example embodiment will be described using FIG. 19. FIG. 19 is a block diagram showing the configuration example of the moving object sound detection device according to the fifth example embodiment. The moving object sound detection device 400 includes a noise estimation unit (noise estimation device) 401, a noise removal unit 402, and a moving object sound detection unit 403.

In the noise estimation unit 401, the noise estimation device 100 according to the second example embodiment functions as the noise estimation means. In the noise estimation unit 401, the noise estimation device 200 according to the third example embodiment or the noise estimation device 300 according to the fourth example embodiment may be configured to function as the noise estimation means.

The noise estimation unit 401 receives an input of an observation signal that includes a moving object sound output from a moving object and noise, estimates the amount of noise in each of time-frequency domains to which the moving object sound in the observation signal belongs, and outputs the estimated amount of noise. The noise estimation unit 401 includes the frequency analysis processing unit 101, the storage unit 102, the noise range estimation unit 103, and the amount-of-noise estimation unit 104. Since the frequency analysis processing unit 101, the storage unit 102, the noise range estimation unit 103, and the amount-of-noise estimation unit 104 are the same as those of the second example embodiment, the description thereof will not be repeated.

The frequency analysis processing unit 101 outputs the input observation signal and the generated power matrix P to the noise removal unit 402, and the amount-of-noise estimation unit 104 outputs the estimated amount of noise in each of the time-frequency domains to which the moving object sound in the observation signal belongs to the noise removal unit 402.

The noise removal unit (noise removal means) 402 removes the noise from the observation signal that is the input signal in the time-frequency domain-feature space, and outputs a power matrix R in the time-frequency domain-feature space after the noise removal. In other words, the noise removal unit 402 outputs the power matrix R in which the powers from which the noise is removed are the elements, respectively, the powers being the features in the time-frequency domains to which the observation signal belongs.

The noise removal unit 402 calculates each of the elements of the power matrix R after the noise removal based on the power matrix P generated by the frequency analysis processing unit 101 and the amount of noise $N_{power}$ (f,t) estimated by the amount-of-noise estimation unit 104. The power matrix P is a power matrix representing the features in the time-frequency domains of the observation signal, in which the power in each of the time-frequency domains is each of the elements, and each of the elements is represented by P(f,t). In addition, the amount of noise $N_{power}$ (f,t) is the estimated amount of noise calculated by Expression (2).

The noise removal unit 402 removes the noise by subtracting or dividing the noise signal (noise) from or by the observation signal. In the case of the noise removal by the subtraction, an element R(f,t) of the power matrix R can be calculated by the following Expression (11).

[Formula 8]

$$R(f,t)=P(f,t)-N_{power}(f,t) \quad (11)$$

In addition, in the case of the noise removal by the division, the element R(f,t) of the power matrix R can be calculated by the following Expression (12).

[Formula 9]

$$R(f,\ t)=\frac{P(f,\ t)}{N_{power}(f,\ t)} \quad (12)$$

The moving object sound detection unit (detection means) 403 detects the moving object sound based on the powers obtained by removing the noise from the powers in the time-frequency domains to which the observation signal belongs. Specifically, the moving object sound detection unit 403 detects the moving object sound output from the moving object using the power matrix R after the noise removal. The moving object sound detection unit 403 may detect the moving object sound, for example, by pattern recognition using a pattern matching method.

<Operation Example of Moving Object Sound Detection Device>

Figure 20:
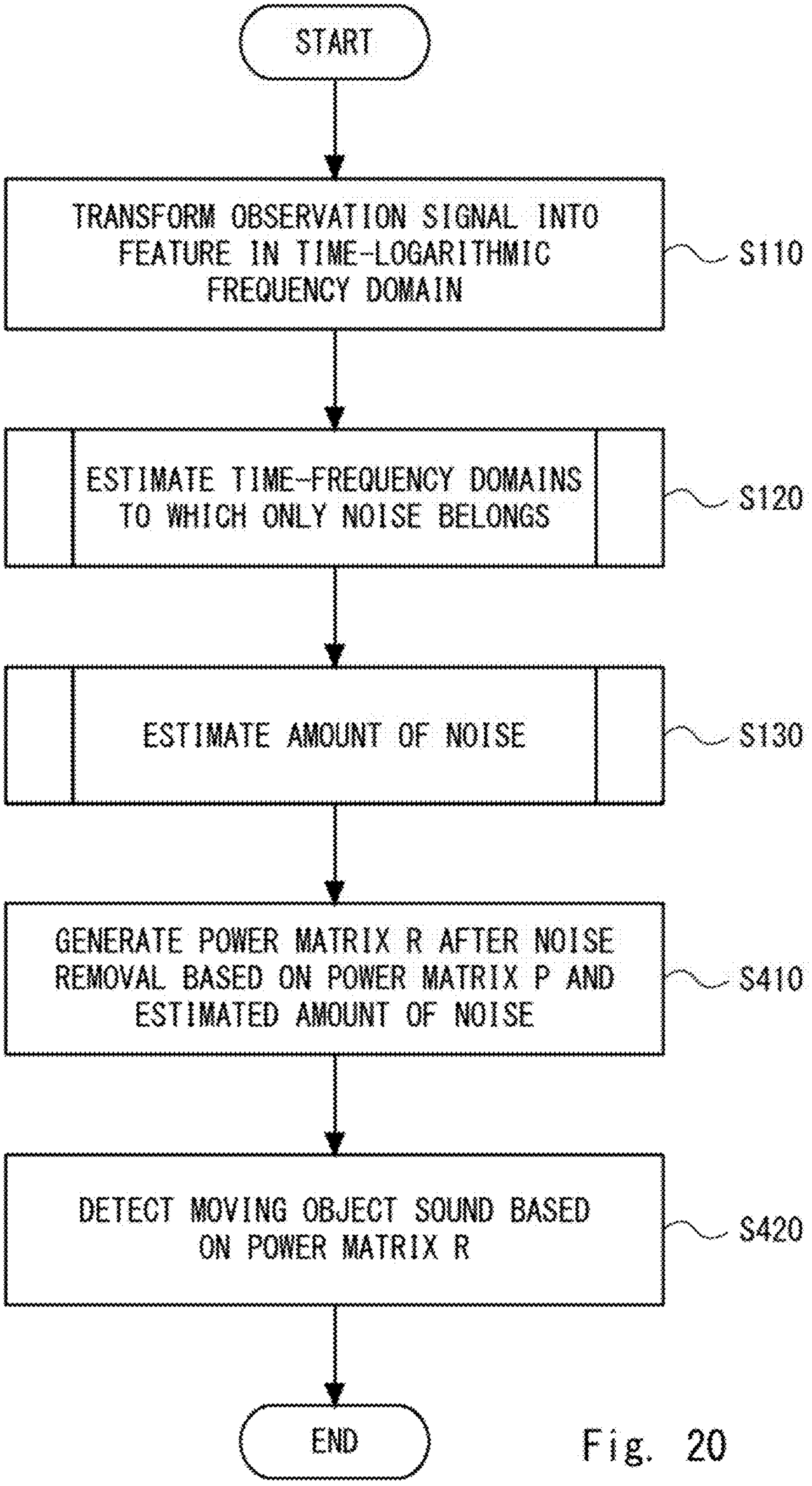
FIG. 20 is a flowchart showing an operation example of the moving object sound detection device according to the fifth example embodiment.

Next, an operation example of the moving object sound detection device 400 will be described using FIGS. 20, 7, and 8. FIG. 20 is a flowchart showing the operation example of the moving object sound detection device according to the fifth example embodiment, and is a flowchart showing an overall operation example of the moving object sound detection device 400.

In FIG. 20, steps S110 to S130 are the same as S110 to S130 described with reference to FIG. 6, and the detailed operation examples of steps S120 and S130 are the same as those of FIGS. 7 and 8, and thus these detailed explanations are omitted.

The frequency analysis processing unit 101 outputs the input observation signal and the generated power matrix P to the noise removal unit 402, and the amount-of-noise estimation unit 104 outputs the estimated amount of noise in each of the time-frequency domains to which the moving object sound in the observation signal belongs to the noise removal unit 402.

The noise removal unit 402 generates the power matrix R after the noise removal based on the power matrix P and the estimated amount of noise $N_{power}$ (f,t) (step S410). When the noise removal unit 402 removes the noise by subtracting the noise signal (noise) from the observation signal, the element R(f,t) of the power matrix R is calculated using Expression (11). When the noise removal unit 402 removes the noise by dividing the noise signal (noise) by the observation signal, the element R(f,t) of the power matrix R is calculated using Expression (12).

The moving object sound detection unit 403 detects the moving object sound output from the moving object based on the power matrix R (step S420). The moving object sound detection unit 403 may detect the moving object sound, for example, by pattern recognition using a pattern matching method.

As described above, in the moving object sound detection device 400, the noise estimation device 200 functions as the noise estimation means, removes the noise from the powers in the time-frequency domains to which the moving object sound belongs, and detects the moving object sound based on the powers from which the noise is removed. As described above, by using the noise estimation device 200, the noise can be appropriately removed from the observation signal. In other words, by removing the estimated noise from the observation signal based on the acoustic characteristics unique to the moving object, a change in frequency characteristics caused by the noise can be corrected, and the moving object can be detected with high accuracy. Accordingly, with the moving object sound detection device 400 according to the fifth example embodiment, the moving object sound can be accurately detected.

Other Example Embodiments

For the above-described example embodiments, the following modifications may be made.

<1> In the description of the second example embodiment, the frequency analysis processing unit 101 transforms the observation signal that is a time waveform signal into a feature in each of (linear) frequency domains. In the second example embodiment, the moving object sound has single peak frequency characteristics. Therefore, the frequency analysis processing unit 101 transforms the observation signal into the feature in each of the linear frequency domains. However, the frequency analysis processing unit 101 according to the second example embodiment may transform the observation signal into a feature in each of logarithmic frequency domains as in the third and fourth example embodiments. Even this way, the same effects as those of the second example embodiment can be exhibited.

<2> In the description of the second example embodiment, the amount-of-noise estimation unit 104 extracts elements corresponding to the time-frequency domains to which the moving object sound and the noise belong using the power matrix P and the mask matrix M, and estimates the amount of noise using the column vector and the row vector including the elements. As in the third and fourth example embodiments, the amount-of-noise estimation unit 104 may regard the average value of powers (powers including only the noise) in the time-frequency domains to which only the noise belongs in the power distribution as the amount of noise in the time-frequency domains to which the moving object sound belongs. In this case, the estimation accuracy of the amount of noise is lower than that of the second example embodiment, but the amount of computation can be reduced.

<3> In the description of the third and fourth example embodiments, the amount-of-noise estimation units 205 and 340 regard the average value of powers in the time-frequency domains to which only the noise belongs in the power distribution as the amount of noise in the time-frequency domains to which the moving object sound belongs. In the third example embodiment, as in the second example embodiment, the amount-of-noise estimation unit 205 may generate a mask matrix M' in the search range, and may regard the amount of noise in the time-frequency domains to which the moving object sound belongs using the search range power matrix P' and the mask matrix M'. In the fourth example embodiment, as in the second example embodiment, the amount-of-noise estimation unit 340 may generate the mask matrix M, and may estimate the amount of noise in the time-frequency domains to which the moving object sound belongs using the power matrix P" and the mask matrix M.

In this case, in the power matrix generated by the frequency analysis processing units 201 and 322, each of the elements corresponds to each of the time-frequency domains to be calculated in the power distribution, and the power in each of the time-frequency domains is the value of each of the elements. The noise range estimation units 204 and 330 generate the mask matrix for specifying the time-frequency domain to which the moving object sound belongs in the power matrix P. As in the second example embodiment, the amount-of-noise estimation units 205 and 340 may estimate the amount of noise in each of the time-frequency domains to which the moving object sound belongs based on the power matrix and the mask matrix. This way, as compared to the third and fourth example embodiments, the amount of computation per formed by the noise estimation devices 200 and 300 increases, but the estimation accuracy of the amount of noise can be improved.

<4> In the description of the third example embodiment, the frequency analysis processing unit 201 generates the power matrix P, the search range setting unit 203 sets the search range, and then the frequency analysis processing unit 201 generates the search range power matrix P'. In the third example embodiment, after the search range setting unit 203 sets the search range, the frequency analysis processing unit 201 may generate the search range power matrix P' based on the set search range without generating the power matrix P. In this case, the frequency analysis processing unit 201 does not generate the power matrix P. Therefore, the amount of computation can be further reduced as compared to the third example embodiment. The search range power matrix P' may be generated by the search range setting unit 203 based on the search range set by the search range setting unit 203 and the power matrix P.

Figure 21:
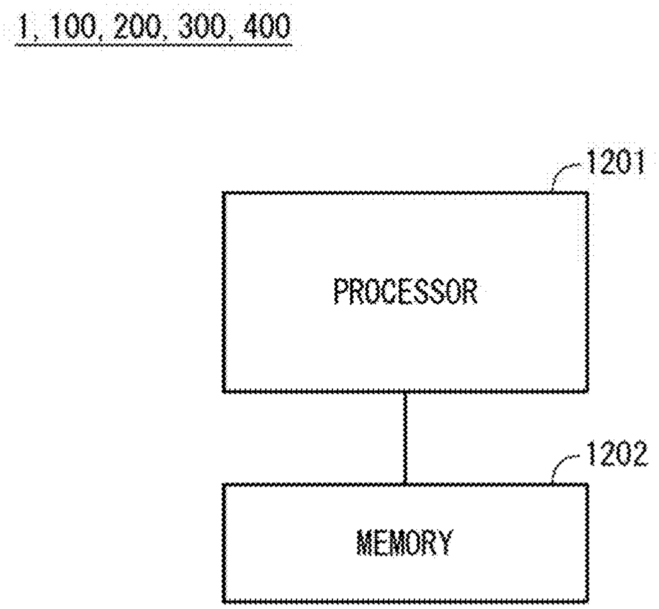
FIG. 21 is a block diagram showing hardware configurations of the noise estimation device and the moving object sound detection device.

<5> The noise estimation device and the moving object sound detection device according to the example embodiments may have the following hardware configuration. FIG. 21 is a block diagram showing a configuration example of the noise estimation device 1, 100, 200, or 300 and the moving object sound detection device 400 (hereinafter, referred to as the noise estimation device 1 and the like) described in the above-described example embodiments. Referring to FIG. 21, the noise estimation device 1 and the like include a processor 1201 and a memory 1202.

By reading software (computer program) from the memory 1202 and executing the read software, the processor 1201 executes the processes of the noise estimation device 1 and the like described using the flowcharts in the above-described example embodiments. The processor 1201 may be, for example, a microprocessor, an MPU (Micro Processing Unit), or a CPU (Central Processing Unit). The processor 1201 may include a plurality of processors.

The memory 1202 may be configured with a combination of a volatile memory and a non-volatile memory. The memory 1202 may include a storage that is disposed to be spaced from the processor 1201. In this case, the processor 1201 may access the memory 1202 through an I/O interface (not shown).

In the example of FIG. 21, the memory 1202 is used for storing a software module group. By reading the software module group from the memory 1202 and executing the read software module group, the processor 1201 can execute the processes of the noise estimation device 1 and the like described in the above-described example embodiments.

As described using FIG. 21, each of the processors in the noise estimation device 1 and the like execute one or a plurality of programs including a command group for causing a computer to execute the algorithms described using the drawings.

In the above-described examples, the program is stored using a non-transitory computer-readable medium and can be supplied to the computer. The non-transitory computer-readable medium includes various types of tangible storage mediums. Examples of the non-transitory computer-readable medium include a magnetic recording medium (for example, a flexible disk, a magnetic tape, or a hard disk drive) and a magneto-optic recording medium (for example, a magneto-optic disk). Further, examples of the non-transitory computer-readable medium include CD-ROM (Read Only Memory), CD-R, and CD-R/W. Further, examples of the non-transitory computer-readable medium include a semiconductor memory. Examples of the semiconductor memory include a mask ROM, a PROM (Programmable ROM), an EPROM (Erasable PROM), a flash ROM, and a RAM (Random Access Memory). In addition, the program may be supplied to the computer using various types of transitory computer-readable media. Examples of the transitory computer-readable media include an electrical signal, an optical signal, and an electromagnetic wave. The transitory computer-readable media can supply the program to the computer through a wired communication path such as an electrical wire or an optical fiber or a wireless communication path.

The present disclosure is not limited to the above-described example embodiments and can be appropriately changed within a range not departing from the scope. In addition, the present disclosure may be implemented as an appropriate combination of the example embodiments.

Some or all of the above-described example embodiments can be described as shown in the following remarks, but the present disclosure is not limited thereto.

(Supplementary note 1) A noise estimation device comprising:

frequency analysis processing means for receiving an input of an observation signal that includes a moving object sound output from a moving object and noise and transforming the observation signal into a feature in each of time-frequency domains;

noise range estimation means for estimating a first feature in a first time-frequency domain to which only the noise belongs based on acoustic characteristic information of the moving object sound and the feature; and amount-of-noise estimation means for estimating an amount of noise in a second time-frequency domain to which the moving object sound belongs based on the first feature.

(Supplementary note 2) The noise estimation device according to note 1, wherein the noise range estimation means calculates a distribution of the features and determines the first feature and a second feature in the second time-frequency domain from the distribution based on the acoustic characteristic information.

(Supplementary note 3) The noise estimation device according to note 2, wherein the noise range estimation means distinguishes the first feature and the second feature from the distribution using a threshold based on the acoustic characteristic information, the threshold being provided for distinguishing the first feature and the second feature among features in the distribution.

(Supplementary note 4) The noise estimation device according to note 3, wherein the acoustic characteristic information includes a predetermined frequency width corresponding to a frequency at which the feature of the moving object sound is a peak, and the noise range estimation means sets the threshold based on the frequency width and a first frequency range to which the observation signal belongs.

(Supplementary note 5) The noise estimation device according to note 4, wherein the noise range estimation means sets the threshold based on a proportion of the frequency width in the first frequency range.

(Supplementary note 6) The noise estimation device according to note 3, wherein the acoustic characteristic information includes frequency characteristics of the moving object sound during standstill of the moving object and a predetermined frequency width corresponding to a frequency at which the feature of the moving object sound is a peak, the noise estimation device further comprises search range setting means for estimating a second frequency range where the moving object sound is present based on speed information of the moving object and the frequency characteristics, and the noise range estimation means calculates a distribution of features of time-frequency domains in the second frequency range and sets the threshold based on the frequency width and the second frequency range.

(Supplementary note 7) The noise estimation device according to note 3, wherein the acoustic characteristic information includes frequency characteristics of the moving object sound during standstill of the moving object and a predetermined frequency width corresponding to a frequency at which the feature of the moving object sound is a peak, the noise estimation device further comprises base information generation means for estimating a second frequency range where the moving object sound is present based on speed information of the moving object and the frequency characteristics and generating a plurality of bases in the second frequency range, the frequency analysis processing means transforms the observation signal into a feature in each of time-frequency domains to which the observation signal belongs based on the observation signal and the plurality of bases, and the noise range estimation means calculates a distribution of features of time-frequency domains in the second frequency range and sets the threshold based on the frequency width and the second frequency range.

(Supplementary note 8) The noise estimation device according to note 7, wherein the base information generation means generates the plurality of base information corresponding to different frequency variations in the second frequency range.

(Supplementary note 9) The noise estimation device according to note 7 or 8, wherein the frequency analysis processing means calculates an activation relative to each of the plurality of bases by orthogonal transformation of the observation signal using each of the plurality of bases at each time to which the observation signal belongs, and determines a feature in a time-frequency domain to which the observation signal belongs based on the activation calculated at each time.

(Supplementary note 10) The noise estimation device according to any one of notes 6 to 9, wherein the noise range estimation means sets the threshold based on a proportion of the frequency width in the second frequency range.

(Supplementary note 11) The noise estimation device according to any one of notes 6 to 10, wherein the speed information includes a maximum speed and a minimum speed of the moving object, and the second frequency range is estimated based on the maximum speed, the minimum speed, and the frequency characteristics.

(Supplementary note 12) The noise estimation device according to any one of notes 2 to 11, wherein the frequency analysis processing means generates a first matrix in which each of elements corresponds to each of time-frequency domains to be calculated in the distribution and a feature in each of the time-frequency domains is a value of each of the elements, the noise range estimation means generates a second matrix for specifying the second time-frequency domain in the first matrix, and the amount-of-noise estimation means estimates an amount of noise in each of the second time-frequency domains based on the first matrix and the second matrix.

(Supplementary note 13) The noise estimation device according to note 12, wherein the noise range estimation means determines a time-frequency domain corresponding to the second feature in the distribution as the second time-frequency domain and generates the second matrix based on the determined second time-frequency domain.

(Supplementary note 14) The noise estimation device according to note 12 or 13, wherein the amount-of-noise estimation means selects an element corresponding to the second time-frequency domain from the second matrix, extracts at least one of a row vector and a column vector including the element from the first matrix and the second matrix, and estimates an amount of noise in a time-frequency domain corresponding to the selected element based on the extracted vector.

(Supplementary note 15) The noise estimation device according to note 14, wherein the amount-of-noise estimation means regards an average value of features in the first time-frequency domains in the extracted vector as the amount of noise in the time-frequency domain corresponding to the selected element.

(Supplementary note 16) The noise estimation device according to any one of notes 2 to 11, wherein the amount-of-noise estimation means regards an average value of the second features in the distribution as an amount of noise in each of the second time-frequency domains.

(Supplementary note 17) The noise estimation device according to any one of notes 1 to 16, wherein the feature is a feature in a time-frequency domain in which a frequency is logarithmically transformed.

(Supplementary note 18) A moving object sound detection device comprising:

frequency analysis processing means for receiving an input of an observation signal that includes a moving object sound output from a moving object and noise and transforming the observation signal into a feature in each of time-frequency domains;

noise range estimation means for estimating a first feature in a first time-frequency domain to which only the noise belongs based on acoustic characteristic information of the moving object sound and the feature;

amount-of-noise estimation means for estimating an amount of noise in a second time-frequency domain to which the moving object sound belongs based on the first feature;

noise removal means for outputting a feature obtained by removing the noise from the feature in each of the time-frequency domains to which the observation signal belongs; and detection means for detecting the moving object sound based on the feature from which the noise is removed.

(Supplementary note 19) A noise estimation method comprising:

receiving an input of an observation signal that includes a moving object sound output from a moving object and noise and transforming the observation signal into a feature in each of time-frequency domains;

estimating a first feature in a first time-frequency domain to which only the noise belongs based on acoustic characteristic information of the moving object sound and the feature; and estimating an amount of noise in a second time-frequency domain to which the moving object sound belongs based on the first feature.

(Supplementary note 20) A moving object sound detection method comprising:

receiving an input of an observation signal that includes a moving object sound output from a moving object and noise and transforming the observation signal into a feature in each of time-frequency domains;

estimating a first feature in a first time-frequency domain to which only the noise belongs based on acoustic characteristic information of the moving object sound and the feature;

estimating an amount of noise in a second time-frequency domain to which the moving object sound belongs based on the first feature;

outputting a feature obtained by removing the noise from the feature in each of the time-frequency domains to which the observation signal belongs; and detecting the moving object sound based on the feature from which the noise is removed.

(Supplementary note 21) A non-transitory computer-readable medium storing a program that causes a computer to execute:

receiving an input of an observation signal that includes a moving object sound output from a moving object and noise and transforming the observation signal into a feature in each of time-frequency domains;

estimating a first feature in a first time-frequency domain to which only the noise belongs based on acoustic characteristic information of the moving object sound and the feature; and estimating an amount of noise in a second time-frequency domain to which the moving object sound belongs based on the first feature.

(Supplementary note 22) A non-transitory computer-readable medium storing a program that causes a computer to execute:

receiving an input of an observation signal that includes a moving object sound output from a moving object and noise and transforming the observation signal into a feature in each of time-frequency domains;

estimating a first feature in a first time-frequency domain to which only the noise belongs based on acoustic characteristic information of the moving object sound and the feature;

estimating an amount of noise in a second time-frequency domain to which the moving object sound belongs based on the first feature;

outputting a feature obtained by removing the noise from the feature in each of the time-frequency domains to which the observation signal belongs; and detecting the moving object sound based on the feature from which the noise is removed.

REFERENCE SIGNS LIST

1, 100, 200, 300 NOISE ESTIMATION DEVICE
2, 101, 201, 322 FREQUENCY ANALYSIS PROCESSING UNIT
3, 103, 204, 330 NOISE RANGE ESTIMATION UNIT
4, 104, 205, 340 AMOUNT-OF-NOISE ESTIMATION UNIT
102, 202, 310 STORAGE UNIT
203 SEARCH RANGE SETTING UNIT
320 SIGNAL TRANSFORMATION UNIT
321 BASE INFORMATION GENERATION UNIT
400 MOVING OBJECT SOUND DETECTION DEVICE
401 NOISE ESTIMATION UNIT
402 NOISE REMOVAL UNIT
403 MOVING OBJECT SOUND DETECTION UNIT

What is claimed is:

1. A noise estimation device comprising:

hardware, including at least one processor and memory;

frequency analysis processing unit, implemented by the hardware, configured to receive an input of an observation signal that includes a moving object sound output from a moving object and noise and transforming the observation signal into a feature in each of time-frequency domains;

noise range estimation unit, implemented by the hardware, configured to estimate a first feature in a first time-frequency domain to which only the noise belongs based on acoustic characteristic information of the moving object sound and the feature; and amount-of-noise estimation unit, implemented by the hardware, configured to estimate an amount of noise in a second time-frequency domain to which the moving object sound belongs based on the first feature.

2. The noise estimation device according to claim 1, wherein the noise range estimation unit calculates a distribution of the features and determines the first feature and a second feature in the second time-frequency domain from the distribution based on the acoustic characteristic information.

3. The noise estimation device according to claim 2, wherein the noise range estimation unit distinguishes the first feature and the second feature from the distribution using a threshold based on the acoustic characteristic information, the threshold being provided for distinguishing the first feature and the second feature among features in the distribution.

4. The noise estimation device according to claim 3, wherein the acoustic characteristic information includes a predetermined frequency width corresponding to a frequency at which the feature of the moving object sound is a peak, and the noise range estimation unit sets the threshold based on the frequency width and a first frequency range to which the observation signal belongs.

5. The noise estimation device according to claim 4, wherein the noise range estimation unit sets the threshold based on a proportion of the frequency width in the first frequency range.

6. The noise estimation device according to claim 3, wherein the acoustic characteristic information includes frequency characteristics of the moving object sound during standstill of the moving object and a predetermined frequency width corresponding to a frequency at which the feature of the moving object sound is a peak, the noise estimation device further comprises search range setting unit, implemented by the hardware, configured to estimate a second frequency range where the moving object sound is present based on speed information of the moving object and the frequency characteristics, and the noise range estimation unit calculates a distribution of features of time-frequency domains in the second frequency range and sets the threshold based on the frequency width and the second frequency range.

7. The noise estimation device according to claim 6, wherein the noise range estimation unit sets the threshold based on a proportion of the frequency width in the second frequency range.

8. The noise estimation device according to claim 6, wherein the speed information includes a maximum speed and a minimum speed of the moving object, and the second frequency range is estimated based on the maximum speed, the minimum speed, and the frequency characteristics.

9. The noise estimation device according to claim 3, wherein the acoustic characteristic information includes frequency characteristics of the moving object sound during standstill of the moving object and a predetermined frequency width corresponding to a frequency at which the feature of the moving object sound is a peak, the noise estimation device further comprises base information generation unit, implemented by the hardware, configured to estimate a second frequency range where the moving object sound is present based on speed information of the moving object and the frequency characteristics and generating a plurality of bases in the second frequency range, the frequency analysis processing unit transforms the observation signal into a feature in each of time-frequency domains to which the observation signal belongs based on the observation signal and the plurality of bases, and the noise range estimation unit calculates a distribution of features of time-frequency domains in the second frequency range and sets the threshold based on the frequency width and the second frequency range.

10. The noise estimation device according to claim 9, wherein the base information generation unit generates the plurality of base information corresponding to different frequency variations in the second frequency range.

11. The noise estimation device according to claim 9, wherein the frequency analysis processing unit calculates an activation relative to each of the plurality of bases by orthogonal transformation of the observation signal using each of the plurality of bases at each time to which the observation signal belongs, and determines a feature in a time-frequency domain to which the observation signal belongs based on the activation calculated at each time.

12. The noise estimation device according to claim 2, wherein the frequency analysis processing unit generates a first matrix in which each of elements corresponds to each of time-frequency domains to be calculated in the distribution and a feature in each of the time-frequency domains is a value of each of the elements, the noise range estimation unit generates a second matrix for specifying the second time-frequency domain in the first matrix, and the amount-of-noise estimation unit estimates an amount of noise in each of the second time-frequency domains based on the first matrix and the second matrix.

13. The noise estimation device according to claim 12, wherein the noise range estimation unit determines a time-frequency domain corresponding to the second feature in the distribution as the second time-frequency domain and generates the second matrix based on the determined second time-frequency domain.

14. The noise estimation device according to claim 12, wherein the amount-of-noise estimation unit selects an element corresponding to the second time-frequency domain from the second matrix, extracts at least one of a row vector and a column vector including the element from the first matrix and the second matrix, and estimates an amount of noise in a time-frequency domain corresponding to the selected element based on the extracted vector.

15. The noise estimation device according to claim 14, wherein the amount-of-noise estimation unit regards an average value of features in the first time-frequency domains in the extracted vector as the amount of noise in the time-frequency domain corresponding to the selected element.

16. The noise estimation device according to claim 2, wherein the amount-of-noise estimation unit regards an average value of the second features in the distribution as an amount of noise in each of the second time-frequency domains.

17. The noise estimation device according to claim 1, wherein the feature is a feature in a time-frequency domain in which a frequency is logarithmically transformed.

18. A noise estimation method comprising:

receiving an input of an observation signal that includes a moving object sound output from a moving object and noise and transforming the observation signal into a feature in each of time-frequency domains;

estimating a first feature in a first time-frequency domain to which only the noise belongs based on acoustic characteristic information of the moving object sound and the feature; and estimating an amount of noise in a second time-frequency domain to which the moving object sound belongs based on the first feature.

19. A non-transitory computer-readable medium storing a program that causes a computer to execute:

receiving an input of an observation signal that includes a moving object sound output from a moving object and noise and transforming the observation signal into a feature in each of time-frequency domains;

estimating a first feature in a first time-frequency domain to which only the noise belongs based on acoustic characteristic information of the moving object sound and the feature; and estimating an amount of noise in a second time-frequency domain to which the moving object sound belongs based on the first feature.

* * * * *